United States Patent
Hidaka et al.

(10) Patent No.: US 11,870,926 B2
(45) Date of Patent: Jan. 9, 2024

(54) ON-VEHICLE HANDS-FREE APPARATUS, COMMUNICATION CONTROL METHOD, AND COMPUTER-READABLE MEDIUM

(71) Applicant: Panasonic Intellectual Property Management Co., Ltd., Osaka (JP)

(72) Inventors: Jun Hidaka, Kanagawa Ken (JP); Katsuyuki Itou, Kanagawa Ken (JP); Eiyoshi Nakatsuji, Kanagawa Ken (JP); Tomoaki Katada, Kanagawa Ken (JP); Yuki Murata, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 151 days.

(21) Appl. No.: 17/553,117

(22) Filed: Dec. 16, 2021

(65) Prior Publication Data
US 2022/0201114 A1 Jun. 23, 2022

(30) Foreign Application Priority Data
Dec. 23, 2020 (JP) .................................. 2020-214221

(51) Int. Cl.
*H04M 1/60* (2006.01)
*H04M 3/02* (2006.01)
*H04M 1/27453* (2020.01)

(52) U.S. Cl.
CPC ..... *H04M 1/6075* (2013.01); *H04M 1/27453* (2020.01); *H04M 3/02* (2013.01); *H04M 2203/551* (2013.01)

(58) Field of Classification Search
CPC .. H04M 1/6075; H04M 1/27453; H04M 3/02; H04M 2203/551; H04M 1/2757; H04M 1/72469; H04M 2250/60
See application file for complete search history.

(56) References Cited

U.S. PATENT DOCUMENTS

| 8,825,028 B2 * | 9/2014 | Okuda | H04M 1/575 |
| | | | 455/41.3 |
| 11,722,861 B2 * | 8/2023 | Himelfarb | H04W 4/16 |
| | | | 455/415 |

(Continued)

FOREIGN PATENT DOCUMENTS

| JP | 2002-193046 | 7/2002 |
| JP | 2014-116958 | 6/2014 |

OTHER PUBLICATIONS

Sandhu, Hargun, and Dietmar PF Möller. "Mobile Applications and Secure Vehicular Integration." 2018 IEEE International Conference on Electro/Information Technology (EIT). IEEE, 2018. (Year: 2018).*

(Continued)

*Primary Examiner* — Sharad Rampuria
(74) *Attorney, Agent, or Firm* — GREENBLUM & BERNSTEIN, P.L.C.

(57) ABSTRACT

An on-vehicle hands-free apparatus according to the present disclosure enables a hands-free call by being connected to a mobile phone in a wireless or wired manner. The on-vehicle hands-free apparatus includes a memory, and a hardware processor coupled to the memory. The hardware processor is configured to: cause the mobile phone to execute an outgoing/incoming call using a phone function of the mobile phone based on outgoing/incoming call history data or phone book data stored in the mobile phone, the outgoing/incoming call history data including a phone number transmitted and received by the mobile phone; and acquire the outgoing/incoming call history data including a phone number of a counterpart of a call from the mobile phone when the call is terminated on the mobile phone.

10 Claims, 15 Drawing Sheets

(56) References Cited

U.S. PATENT DOCUMENTS

| | | |
|---|---|---|
| 2002/0032048 A1 | 3/2002 | Kitao et al. |
| 2007/0178944 A1 | 8/2007 | Mitsuru et al. |
| 2010/0061532 A1* | 3/2010 | Takiguchi ............ H04M 15/58 379/142.06 |
| 2010/0062714 A1* | 3/2010 | Ozaki .................. H04W 76/14 455/41.3 |
| 2010/0197362 A1* | 8/2010 | Saitoh ................. H04M 1/2757 455/569.2 |
| 2012/0322423 A1* | 12/2012 | Momiyama ......... H04M 1/6075 455/414.1 |
| 2014/0066133 A1 | 3/2014 | Ozaki |
| 2015/0229748 A1 | 8/2015 | Ozaki |
| 2017/0085692 A1 | 3/2017 | Ozaki |
| 2018/0255165 A1 | 9/2018 | Ozaki |
| 2019/0289112 A1 | 9/2019 | Ozaki |
| 2021/0126998 A1 | 4/2021 | Ozaki |

OTHER PUBLICATIONS

Escuín, David, et al. "A Long-Distance Smart Driving Service Based on Floating Car Data and Open Data." IEEE Access 10 (2022): 80833-80846. (Year: 2022).*

* cited by examiner

FIG.2
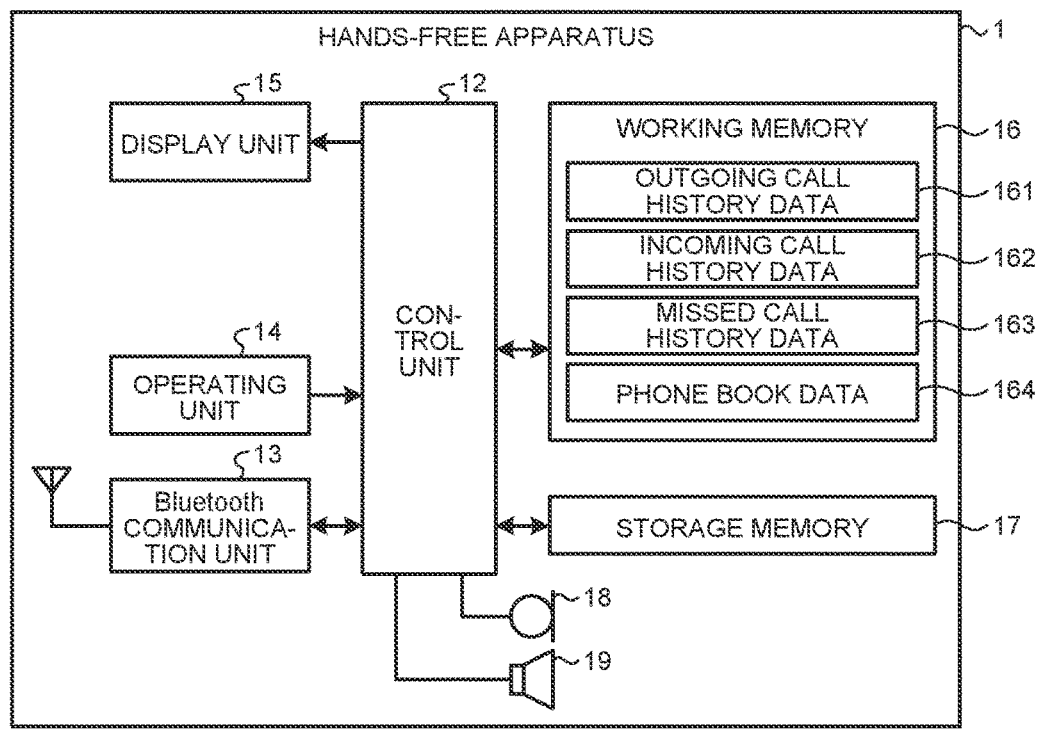
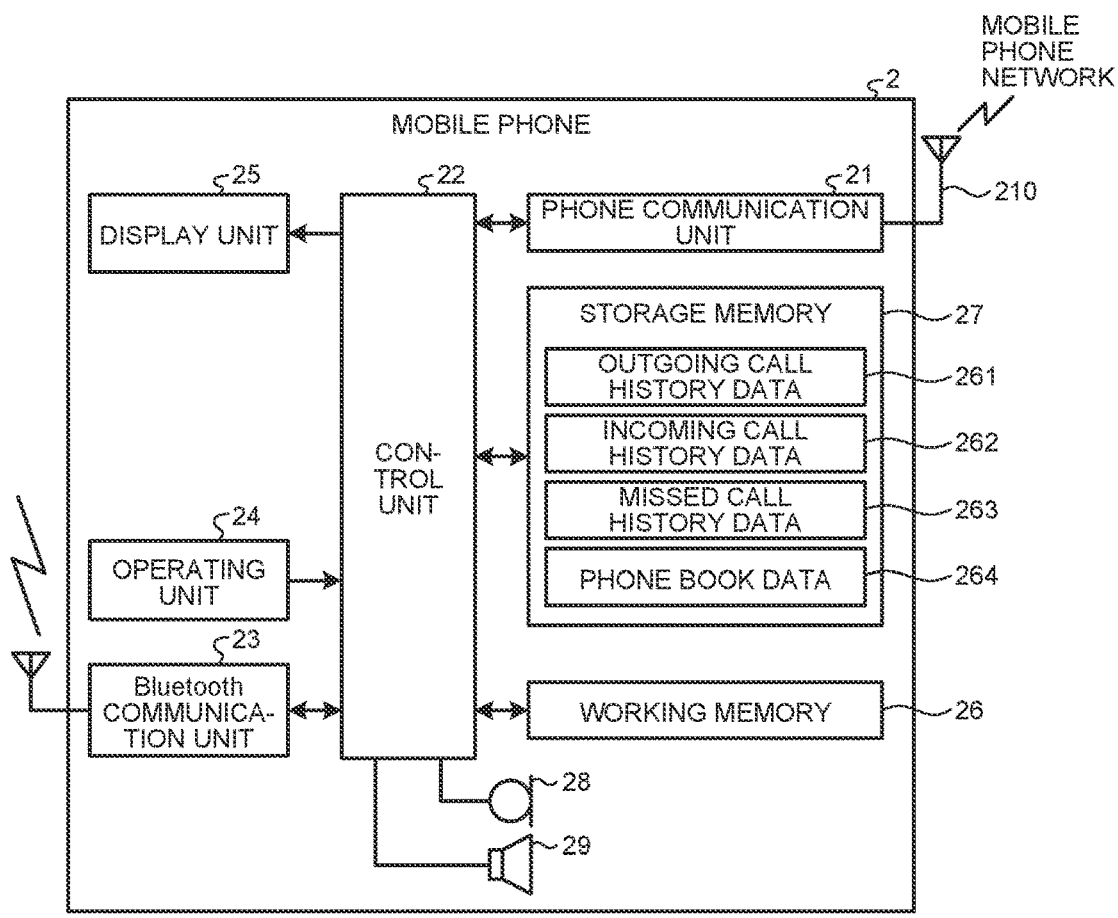

ON-VEHICLE HANDS-FREE APPARATUS, COMMUNICATION CONTROL METHOD, AND COMPUTER-READABLE MEDIUM

CROSS-REFERENCE TO RELATED APPLICATIONS

This application is based upon and claims the benefit of priority from Japanese Patent Application No. 2020-214221, filed on Dec. 23, 2020, the entire contents of which are incorporated herein by reference.

FIELD

Embodiments described herein relate generally to an on-vehicle hands-free apparatus, a communication control method, and a computer-readable medium.

BACKGROUND

In the related art, there has been known a hands-free apparatus that enables a user to receive an incoming call and make an outgoing call without directly operating a mobile phone by establishing a communication channel with the mobile phone. Such a hands-free apparatus is installed in a vehicle, for example, and is used when the user holds a phone conversation while driving. Such a hands-free apparatus receives an incoming call and makes an outgoing call via a mobile phone by an application built in the hands-free apparatus (see Japanese Patent Application Laid-open No. 2002-193046).

It has not been sufficiently studied to improve convenience related to a function of a hands-free apparatus that makes a hands-free call by using an application having a phone function built in a mobile phone.

The present disclosure provides an on-vehicle hands-free apparatus, a communication control method, and a computer-readable medium, capable of improving convenience related to a function of making a hands-free call by using an application having a phone function built in a mobile phone.

SUMMARY

An on-vehicle hands-free apparatus according to the present disclosure enables a hands-free call by being connected to a mobile phone in a wireless or wired manner. The on-vehicle hands-free apparatus includes a memory, and a hardware processor coupled to the memory. The hardware processor is configured to: cause the mobile phone to execute an outgoing/incoming call using a phone function of the mobile phone based on outgoing/incoming call history data or phone book data stored in the mobile phone, the outgoing/incoming call history data including a phone number transmitted and received by the mobile phone; and acquire the outgoing/incoming call history data including a phone number of a counterpart of a call from the mobile phone when the call is terminated on the mobile phone.

BRIEF DESCRIPTION OF THE DRAWINGS

FIG. 2 is a diagram illustrating an example of a hardware configuration of the hands-free apparatus and a mobile phone according to an embodiment;

FIG. 15 is a diagram illustrating an example of a connection pattern between the hands-free apparatus 1 according to an embodiment and one mobile phone 2a;

DETAILED DESCRIPTION

Hereinafter, embodiments of an on-vehicle hands-free apparatus and a communication control method according to the present disclosure will be described with reference to the drawings.

Embodiment

Figure 1:
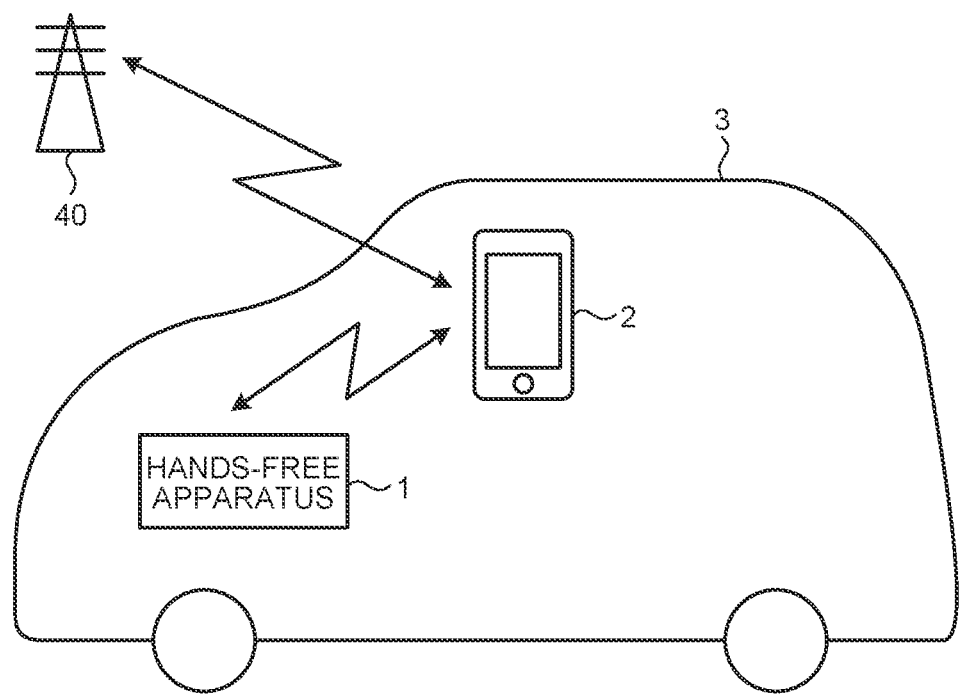
FIG. 1 is a diagram illustrating an example of a usage mode of a hands-free apparatus according co an embodiment.

FIG. 1 diagram illustrating an example of a usage mode of a hands-free apparatus according to an embodiment. As illustrated in FIG. 1, the hands-free apparatus 1 of the present embodiment can be installed in a vehicle 3. The hands-free apparatus 1 is an example of an on-vehicle hands-free apparatus in the present embodiment.

The hands-free apparatus 1 is connected for communication to a mobile phone 2 in a wireless or wired manner. The mobile phone 2 wirelessly communicates with a base station 40 via a mobile phone network.

The hands-free apparatus 1 is connected to the mobile phone network via the mobile phone 2. With this, for example, a driver of the vehicle 3 can make an outgoing call and receive an incoming call by operating the hands-free apparatus 1 even without operating the mobile phone 2. That is, the hands-free apparatus 1 enables a hands-free call by being wirelessly connected to the mobile phone 2. Note that the hands-free apparatus 1 is, for example, a display audio device mounted on the vehicle 3. Furthermore, the hands-free apparatus 1 may be implemented as one function of an in-vehicle navigation device.

FIG. 2 is a diagram illustrating an example of a hardware configuration of the hands-free apparatus 1 and the mobile phone 2 according to an embodiment. The hands-free apparatus 1 includes a control unit 12, a Bluetooth (registered trademark) communication unit 13, an operating unit 14, a display unit 15, a working memory 16, a storage memory 17, a microphone 18, and a speaker 19. Note that the hands-free apparatus 1 may further include an interface that can be connected to an external device in a wired manner by a universal serial bus (USB) cable or the like. Furthermore, the hands-free apparatus 1 may further include an interface that can be connected to an external device in wireless manner by Wi-Fi (registered trademark).

The control unit 12 controls an entire operation such as a communication operation and a data management operation of the hands-free apparatus 1. The control unit 12 is, for example, a processor (hardware processor) such as a central processing unit (CPU).

The Bluetooth communication unit 13 has a communication function corresponding to a Bluetooth system, which is near-field wireless communication means. The Bluetooth communication unit 13 establishes a wireless communication channel with the mobile phone 2 present within a Bluetooth coverage area, and performs communication based on Bluetooth communication standards. In such a case, it is assumed that the mobile phone 2 has a Bluetooth communication function and is present within the Bluetooth wireless coverage area of the hands-free apparatus 1.

The Bluetooth communication unit 13 of the present embodiment has a communication function based on a well-known hands-free profile (HFP) for making a hands-free call and a phone book access profile (PBAP) for transferring phone book data and outgoing/incoming call history data. These protocols mean communication protocols defined for each function.

The mobile phone 2 has a function of establishing a mobile phone line with the base stat ion 40 of the mobile phone network and performs outgoing call processing and incoming call processing by a known technology.

The mobile phone 2 is, for example, a smartphone, and has a communication function based on the Bluetooth (registered trademark) system, which is near-field wireless communication means. In the present embodiment, as an example, the mobile phone 2 includes a phone communication unit 21, a control unit 22, a Bluetooth communication unit 23, an operating unit 24, a display unit 25, a working memory 26, a storage memory 27, a microphone 28, and a speaker 29. Note that the mobile phone 2 may further include an interface that can be connected to an external device in a wired manner. Furthermore, the mobile phone 2 may further include an interface that can be connected to an external device in a wireless manner by Wi-Fi (registered trademark).

The phone communication unit 21 can make wireless connection to the mobile phone network via an antenna 210 under the control of the control unit 22. The phone communication unit 21 demodulates call voice received from a counterpart terminal via the base station 40 and the antenna 210, and outputs the demodulated voice to the control unit 22. Furthermore, the phone communication unit 21 modulates input voice from a user during a call and transmits the modulated voice to the counterpart terminal via the antenna 210, the base station 40, or the like.

The control unit 22 of the mobile phone 2 controls an entire operation such as a communication operation and a data management operation of the mobile phone 2. The control unit 22 is, for example, a processor such as a CPU.

The Bluetooth communication unit 23 of the mobile phone 2 has a communication function based on the well-known HFP for making a hands-free call and the PBAP for transferring phone book data and outgoing/incoming call history data.

The operating unit 24 of the mobile phone 2 is operating means that can be operated by a user. For example, the operating unit 24 is composed of touch keys formed on the display unit 25, detects a user's operation, and outputs an operating signal representing the operation content to the control unit 22. In the present embodiment, it is assumed that the operating unit 24 and the display unit 25 serve as a touch panel. Note that the configuration of the operating unit 24 is not limited thereto. The operating unit 24 may be provided separately from the display unit 25. For example, the operating unit 24 may include a dial key formed as a physical button.

When a display signal is input from the control unit 12, the display unit 25 of the mobile phone 2 displays a display screen on the basis of the input display signal. The display unit 25 is, for example, a liquid crystal display or an organic electro luminescence (EL) display; however, the display unit 25 is not limited thereto. The display unit 15 is an example of a first display unit (a first display) in the present embodiment. The display unit 25 of the mobile phone 2 is an example of a second display unit (a second display) in the present embodiment.

The working memory 26 is a volatile memory. The working memory 26 is, for example, a random access memory (RAM). Furthermore, the storage memory 27 is a nonvolatile memory. The storage memory 17 is, for example, a read only memory (ROM), a flash memory, or the like. The working memory 26 or the storage memory 27 stores, for example, out going call history data 261, incoming call history data 262, missed call history data 263, and phone book data 264. FIG. 2 illustrates that the storage memory 27 stores the outgoing call history data 261, the incoming call history data 262, the missed call history data 263, and the phone book data 264, but the working memory 26 may also store these data.

Note that the mobile phone 2 may be a mobile phone of a type other than the smartphone as long as it has a communication function based on the Bluetooth system. Furthermore, the mobile phone 2 may also communicate with the hands-free apparatus 1 by Wi-Fi (registered trademark) wireless communication or wired communication.

The mobile phone 2 can perform outgoing call processing and incoming call processing even in a state in which the mobile phone 2 does not connect to the hands-free apparatus 1 with the HFP. In the present embodiment, a state in which the mobile phone 2 does not connect to the hands-free apparatus 1 with the HFP is referred to a state in which the mobile phone 2 is single.

For example, when the user operates dial keys (not illustrated) to input a phone number of an outgoing call destination and then operates an outgoing call key (not illustrated), the mobile phone 2 can make an out going call using the phone number as the outgoing call destination and communicate with a mobile phone of the outgoing call destination. Such processing is referred to as outgoing call processing in the mobile phone 2. The dial keys are, for example, keys corresponding to numbers from "0" to "9". In the present embodiment, the term "key" may be the operating unit 24 such as a physically provided button, or an electronic operating unit 24 displayed on the display unit 25 as an image.

Furthermore, when the mobile phone 2 receives an incoming call signal from the base station 40 in response to an outgoing call from another mobile phone, which is an outgoing call source and makes a call with the mobile phone 2 as an outgoing call destination, the mobile phone 2 receives a phone number of the mobile phone, which is the outgoing call source, from the base station 40, as an incoming phone number. In such a case, when the mobile phone 2 receives a user's operation of an incoming call key (not illustrated) on the mobile phone 2, the mobile phone 2 answers the other mobile phone which is the outgoing call source. With this, the user of the mobile phone 2 can communicate with the other mobile phone which is the outgoing call source. Such processing is referred to as incoming call processing in the mobile phone 2.

Furthermore, in the present embodiment, when the outgoing call history data 261 and the incoming call history data 262 are collectively referred to, they are referred to as outgoing/incoming call history data. Furthermore, the outgoing call history data 261, the incoming call history data 262, the missed call history data 263, and the phone book data 264 are examples of data related to a phone number.

The outgoing call history data 261 includes an outgoing phone number which is an outgoing call destination of a call made by the mobile phone 2. The incoming call history data 262 includes an incoming phone number which is a source of an incoming call from the mobile phone 2.

Furthermore, the mobile phone 2 has a timepiece unit (not illustrated) that measures a date and time. In the outgoing call history data 261, the incoming call history data 262, and the missed call history data 263, the outgoing call time or incoming call time measured by the timepiece unit is correlated with the outgoing phone number or the incoming phone number.

The phone book data 264 is data in which phone numbers and registered names are correlated with each other. More specifically, in the present embodiment, the phone book data 264 includes first information including the phone numbers and the names corresponding to the phone numbers, and second information including information related to at least one application correlated with the phone numbers or the names.

In the present embodiment, the hands-free apparatus 1 can make a call by using the phone function of the mobile phone 2 without using data related to phone numbers stored in the working memory 16 or the storage memory 17, but may also store the data related to phone numbers.

For example, the hands-free apparatus 1 also stores outgoing call history data 161 and incoming call history data 162. Specifically, as illustrated in FIG. 2, the working memory 16 of the hands-free apparatus 1 stores the outgoing call history data 161 and the incoming call history data 162. It is assumed that the outgoing call history data 161 and the incoming call history data 162 stored in the hands-free apparatus 1 include not only phone numbers transmitted and received using the phone function of the hands-free apparatus 1, but also the history of phone numbers transmitted and received by the mobile phone 2. A method of synchronizing outgoing/incoming history between the hands-free apparatus 1 and the mobile phone 2 will be described below.

Furthermore, the working memory 16 of the hands-free apparatus 1 may further store missed call history data 163 and phone book data 164. The missed call history data 163 and the phone book data 164 may be copied from the missed call history data 263 and the phone book data 264 stored in the mobile phone 2, or may have different contents on the hands-free apparatus 1 and the mobile phone 2.

Furthermore, the hands-free apparatus 1 of the present embodiment may adopt a configuration that does not store the phone book data 164.

Note that the storage memory 17 may also store the outgoing call history data 161, the incoming call history data 162, the missed call history data 163, and the phone book data 164, as well as the working memory 16.

In the phone book data 164 and 264, at least names and phone numbers are correlated with each other.

Furthermore, in the outgoing call history data 161 and 261, outgoing phone numbers, which are outgoing call destinations of calls made by the mobile phone 2 or the hands-free apparatus 1, names of the outgoing call destinations, and outgoing call times are correlated with each other. The names of the outgoing call destinations may be included in the outgoing call history data 261 transferred from the mobile phone 2, or the names registered in the phone book data 164 may be combined with the outgoing call history data 161 by the hands-free apparatus 1. The outgoing call history data 161 and 261 may not include the names.

The outgoing call history data 161 includes not only calls made from the mobile phone 2, but also the history of calls made from the hands-free apparatus 1.

Furthermore, in the incoming call history data 162 and 262, incoming phone numbers, which are outgoing call destinations of calls received by the mobile phone 2 or the hands-free apparatus 1, names of the outgoing call sources of the received calls, and incoming call times are correlated with each other. The names of the outgoing call sources may be included in the incoming call history data 262 transferred from the mobile phone 2, or the names registered in the phone book data 164 may be combined with the incoming call history data 162 by the hands-free apparatus 1. The incoming call history data 162 and 262 may not include the names.

The incoming call history data 162 includes not only calls received by the mobile phone 2 alone, but also the history of calls received by the hands-free apparatus 1 via the mobile phone 2.

Furthermore, when the mobile phone 2 does not answer an incoming call, the missed call history data 163 and 263 include an incoming phone number which is a source of the received call. The incoming call history data 162 and 262 may include the missed call history data 163 and 263.

Furthermore, when data stored in the mobile phone 2 and data stored in the hands-free apparatus 1 are distinguished from each other, for example, the phone book data 264 may be used as first phone book data and the phone book data 164 may be used as second phone book data. Furthermore, the outgoing call history data 261 may be used as first outgoing call history data and the outgoing call history data 161 may be used as second outgoing call history data. The incoming call history data 262 may be used as first incoming call history data and the incoming all history data 162 may be used as second incoming call history data. The missed call history data 263 may be used as first missed call history data and the missed call history data 163 may be used as second missed call history data.

The operating unit 14 of the hands-free apparatus 1 is operating means that can be operated by the user. For example, the operating unit 14 is composed of touch keys formed on the display unit 15, detects a user's operation, and outputs an operating signal representing the operation content to the control unit 12. In the present embodiment, it is assumed that the operating unit 14 and the display unit 15 serve as a touch panel. Note that the configuration of the operating unit 14 is not limited thereto. The operating unit 14 may be provided separately from the display unit 15.

When a display signal is input from the control unit 12, the display unit 15 displays a display screen on the basis of the input display signal, and displays, for example, a display screen, in which dial keys corresponding to "0" to "9" are arranged, as a display screen on which the user inputs a phone number. The display unit 15 is, for example, a liquid crystal display or an organic EL display; however, the display unit 15 is not limited thereto. The display unit 15 is an example of a first display unit in the present embodiment.

The working memory 16 is a volatile memory. The working memory 16 stores, for example, the outgoing call history data 161, the incoming call history data 162, the missed call history data 163, and the phone book data 164. The working memory 16 is, for example, a RAM.

The storage memory 17 is a nonvolatile memory. The storage memory 17 is, for example, a ROM. Furthermore, the storage memory 17 may be a writable storage medium such as a flash memory. In such a case, for example, various data temporarily stored in the working memory 16 may be stored in the storage memory 17 periodically or at a specified timing. The storage memory 17 stores, for example, various computer programs to be executed by the hands-free apparatus 1. Furthermore, the hands-free apparatus 1 may further include a storage such as a hard disk drive (HDD).

The working memory 16 and the storage memory 17 are examples of a storage unit (storage) in the present embodiment.

The microphone 18 inputs a voice uttered by the user when making a hands-free call using the mobile phone 2. The microphone 18 is also referred to as a voice input unit.

The speaker 19 outputs the received voice of a call counterpart when the hands-free apparatus 1 makes a hands-free call using the mobile phone 2. The speaker 19 is also referred to as a voice output unit.

The hands-free apparatus 1 may also include various functional blocks required for a navigation operation, in addition to the functional blocks illustrated in the drawing. For example, the hands-free apparatus 1 may also include a current position detector such as a GPS device that detects a current position of the vehicle 3, a route search unit that searches for a route from the current position to a destination, a map data reading unit that reads map data from a recording medium recording the map data, a VICS (registered trademark) information reception unit that receives VICS information distributed from a VICS center, a voice recognition unit that voice-recognizes a voice uttered by the user, or the like. The hands-free apparatus 1 may extract GPS date and time information from GPS wireless signals received by the GPS device from GPS satellites to acquire a date and time, and use the acquired date and time as an outgoing call date and time or an incoming call date and time.

The hands-free apparatus 1 described above is started and stopped in conjunction with the on and off of an ACC switch, for example. The ACC switch is a switch that turns on and off the supply of power to vehicle devices. When the ACC switch is switched from on to off in response to a user's operation, for example, the supply of power to the hands-free apparatus 1 is stopped. As a consequence, the hands-free apparatus 1 is powered off. In such a case, various data stored in the storage memory 17 immediately before are stored and retained without being deleted, but the outgoing call history data 161, the incoming call history data 162, the missed call history data 163, and the phone book data 164 stored in the working memory 16 immediately before are deleted.

Next, details of the functions of the hands-free apparatus 1 of the present embodiment will be described.

Figure 3:
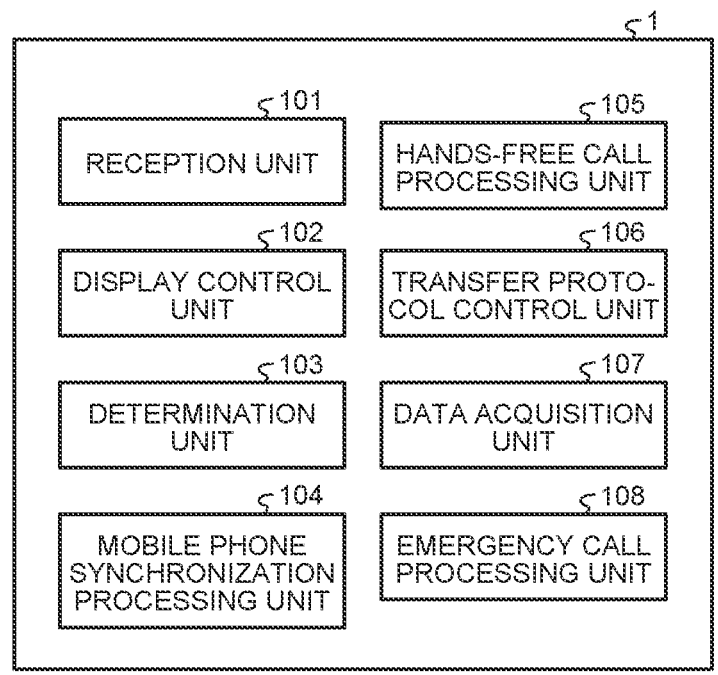
FIG. 3 is a diagram illustrating an example of functions provided in the hands-free apparatus according to an embodiment.

FIG. 3 is a diagram illustrating an example of the functions provided in the hands-free apparatus 1 according to an embodiment. As illustrated in FIG. 3, the hands-free apparatus 1 of the present embodiment includes a reception unit 101, a display control unit 102, a determination unit 103, a mobile phone synchronization processing unit 104, a hands-free call processing unit 105, a transfer protocol control unit 106, a data acquisition unit 107, and an emergency call processing unit 108.

The reception unit 101, the display control unit 102, the determination unit 103, the mobile phone synchronization processing unit 104, the hands-free call processing unit 105, the transfer protocol control unit 106, the data acquisition unit 107, and the emergency call processing unit 108 are implemented by the control unit 12 that reads the computer programs from the storage memory 17. The functions illustrated in FIG. 3 are examples, and the control unit 12 of the hands-free apparatus 1 may further implement other functions. Furthermore, the reception unit 101, the display control unit 102, the determination unit 103, the mobile phone synchronization processing unit 104, the hands-free call processing unit 105, the transfer protocol control unit 106, the data acquisition unit 107, and the emergency, call processing unit 108 may be implemented by a hardware circuit.

The reception unit 101 receives various operations from the user. For example, when the user operates the operating unit 14, the reception unit 101 receives the user's operation via the operating unit 14.

For example, the reception unit 101 receives an operation for selecting a connection mode with the mobile phone 2 from the user.

Hereinafter, the type of a connection mode between the hands-free apparatus 1 and the mobile phone 2 in the present embodiment, and the type of means for executing an outgoing/incoming call and making a call will be described.

The hands-free apparatus 1 of the present embodiment can connect to the mobile phone 2 by using the aforementioned HFP in order to make a hands-free call, and then execute an outgoing/incoming call and make a call by using the phone function of the hands-free apparatus 1. Such a connection mode between the hands-free apparatus 1 and the mobile phone 2 based on the HFP is an example of a second connection mode in the present embodiment.

The connection in the second connection mode and the executing an outgoing/incoming call and making a call using the second connection mode are performed by the hands-free call processing unit 105. The hands-free call processing unit 105 is an example of a call processing unit in the present embodiment. Furthermore, a known hands-free telephone (HFT) function can be adopted as a function of making a hands-free call via the HFP-based connection.

The hands-free call processing unit 105 makes connection to the mobile phone 2 in the second connection mode, and then executes an outgoing/incoming call via the mobile phone 2 by using the phone function of the hands-free apparatus 1. Since the hands-free call processing unit 105 is an internal function of the hands-free apparatus 1, it is also referred to as an internal phone application. Hereinafter, the internal phone application is simply referred to as an internal application.

More specifically, the hands-free call processing unit 105 makes connection to the mobile phone 2 by a communication protocol based on the HFP so that a hands-free call can be made. More specifically, by controlling the Bluetooth communication unit 13, the hands-free call processing unit 105 makes connection to the mobile phone 2 so that a hands-free call can be made.

Furthermore, when the HFP-connected mobile phone 2 receives an incoming call, the hands-free call processing unit 105 executes a hands-free call by using the phone function of the hands-free apparatus 1. For example, the hands-free call processing unit 105 receives the received voice of a call counterpart from the mobile phone 2 via the Bluetooth communication unit 13, and causes the speaker 19 to output the received voice. Furthermore, the hands-free call processing unit 105 causes the voice input by the user of the hands-free apparatus 1 through the microphone 18 to be transmitted from the Bluetooth communication unit 13 to the mobile phone 2, thereby causing the voice to be transmitted from the mobile phone 2 to the mobile phone network.

Furthermore, when the hands-free call processing unit 105 makes an outgoing call, data related to the phone numbers stored in the working memory 16 of the storage memory 17 is used.

In the present embodiment, although both the process of connecting the hands-free apparatus 1 and the mobile phone 2 by the HFP and the process of executing an outgoing/incoming call by using the HFP-based connection have been described as the functions of the hands-free call processing unit 105, the connection processing and the call processing may be performed by different functional units.

The hands-free apparatus 1 of the present embodiment can connect to the mobile phone 2 in a mode different from the aforementioned HFP, and then execute an outgoing/incoming call and make a call by using the phone function of the mobile phone 2. For example, the hands-free apparatus 1 may be mirrored with the mobile phone 2 via a USB cable or Wi-Fi (registered trademark).

As the mirroring function, a known function such as CarPlay (registered trademark) or Android Auto (registered trademark) can be adopted. In the present embodiment, an application that uses a function outside the hands-free apparatus 1, such as CarPlay (registered trademark) or Android Auto (registered trademark), is referred to as an external application. When the external application is used, the hands-free apparatus 1 provides a connection and authentication method, and after the connection and authentication, the mobile phone 2 is in principle responsible for screen drawing and execution of various functions.

Furthermore, after the hands-free apparatus 1 and the mobile phone 2 are connected by the mirroring function, it is possible to execute an outgoing/incoming call and make a call by using the phone application provided in the mobile phone 2. Since the phone application provided in the mobile phone 2 is an application installed outside the hands-free apparatus 1, it is referred to as an external phone application.

Furthermore, when executing an outgoing/incoming call and making a call, the external phone application uses the data related to phone numbers stored in the storage memory 27 of the mobile phone 2, that is, the outgoing call history data 261, the incoming call history data 262, the missed call history data 263, and the phone book data 264. When executing an outgoing/incoming call and making a call by using the external phone application, the outgoing call history data 161, the incoming call history data 162, the missed call history data 163, and the phone book data 164 stored in the working memory 16 or the storage memory 17 of the hands-free apparatus 1 are not used.

Note that after the hands free apparatus 1 and the mobile phone 2 are connected by the mirroring function, various applications provided in the mobile phone 2, in addition to the external phone application, can be viewed on the hands-free apparatus 1 by the mirroring function. Various applications provided in the mobile phone 2 include, for example, a map application, a music playback application, a social networking service (SNS), or other message applications provided in the mobile phone 2.

It is assumed that by the mirroring function used in the present embodiment, screen sharing is possible between the hands-free apparatus 1 and the mobile phone 2, the operating unit 14 of the hands-free apparatus 1 can operate the mobile phone 2, the voice input to the microphone 18 of the hands-free apparatus 1 by the user can be input to the mobile phone 2, and the voice received by the mobile phone 2 from a call destination can be output from the speaker 19 of the hands-free apparatus 1. For example, when the operating unit 14 of the hands-free apparatus 1 is a touch panel, the mobile phone synchronization processing unit 104 transmits the coordinates of a touch position received by the reception unit 101 and a key event to the mobile phone 2, so that the mobile phone 2 can receive a user's operation. Such a connection mode between the hands-free apparatus 1 and the mobile phone 2 is a connection mode capable of implementing a call using the function of the mobile phone 2, and is an example of a first connection mode in the present embodiment.

The connection the first connection mode and the executing an outgoing/incoming call and making a call using the first connection mode are performed by the mobile phone synchronization processing unit 104.

For example, on the basis of the outgoing call history data 261, the incoming call history data 262, the missed call history data 263, and the phone book data 264 stored in the mobile phone 2 and including phone numbers transmitted and received by the mobile phone, the mobile phone synchronization processing unit 104 causes the mobile phone 2 to execute an outgoing/incoming call using the phone function of the mobile phone 2.

In other words, the mobile phone synchronization processing unit 104 causes the hands-free apparatus 1 and the mobile phone 2 to cooperate with each other by the external application, and then causes the mobile phone 2 to execute an outgoing/incoming call by the external phone application.

At this time, the mobile phone synchronization processing unit 104 causes the mobile phone 2 to perform outgoing call processing without using the data related to phone numbers stored in the working memory 16 or the storage memory 17.

Furthermore, the mobile phone synchronization processing unit 104 acquires an image, which is displayed on the display unit 25 of the mobile phone 2 connected in the aforementioned first connection mode, by the mirroring function. The image is displayed on the display unit 15 of the hands-free apparatus 1 by the display control unit 102 to be described below, so that a screen of the display unit 25 of the mobile phone 2 is projected onto the display unit 15 of the hands-free apparatus 1.

Furthermore, when the reception unit 101 receives a user's operation for giving instruction to make connection to the mobile phone 2 in the first connection mode, the mobile phone synchronization processing unit 104 makes connection to the mobile phone 2 in the first connection mode.

Furthermore, when the determination unit 103 determines that the mobile phone 2 can be connected to the hands-free apparatus 1 in the first connection mode, the mobile phone synchronization processing unit 104 makes connection to the mobile phone 2 in the first connection mode.

Furthermore, when the phone function application is updated on the mobile phone 2, even though the hands-free apparatus 1 does not take measures such as updating, the mobile phone synchronization processing unit 104 makes connection to the updated mobile phone 2, so that a hands-free call can be made using the phone function of the updated mobile phone 2.

The display control unit 102 causes the display unit 15 to display various screens. In the present embodiment, the display control unit 102 causes the display unit 15 to display the outgoing call history data 161 and the incoming call history data 162 acquired from the mobile phone 2 by the data acquisition unit 107 to be described below. A screen for displaying the outgoing call history data 161 and the incoming call history data 162 is referred to as an outgoing/incoming call history screen. The outgoing/incoming call history screen may display all of the outgoing call history data 161 and the incoming call history data 162, or display the latest several items thereof.

Furthermore, the display control unit 102 changes an image to be displayed on the display unit 15 before and after the hands-free apparatus 1 is connected to the mobile phone 2 in the aforementioned first connection mode. For example, the display control unit 102 causes the display unit 15 of the hands-free apparatus 1 to display an icon image for connection processing before the reception unit 101 receives a user's operation for giving instruction to make connection to the mobile phone 2 in the first connection mode.

Figure 4:
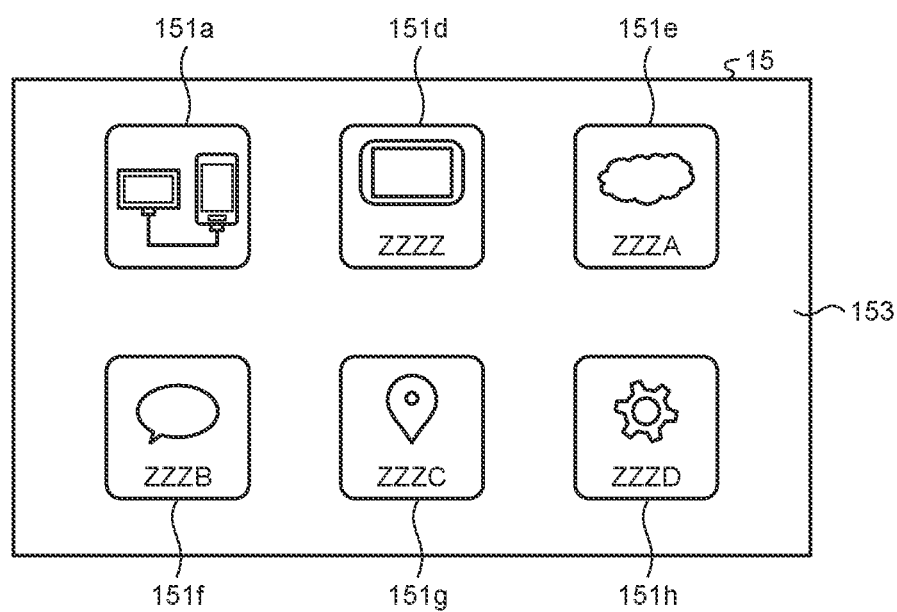
FIG. 4 is a diagram illustrating an example of a screen of the hands-free apparatus, which includes an icon image for connection processing according to an embodiment.

FIG. 4 is a diagram illustrating an example of the screen of the hands-free apparatus 1, which includes an icon image 151*a* for connection processing according to an embodiment. In the example illustrated in FIG. 4, the display unit 15 is a touch panel serving as the operating unit 14. Furthermore, in the example illustrated in FIG. 4, since the hands-free apparatus 1 and the mobile phone 2 are not connected in the first connection mode, it is a state in which mirroring is not able to start. Furthermore, it is assumed that the hands-free apparatus 1 and the mobile phone 2 are connected in the second connection mode based on the HFP.

In such a case, the display control unit 102 displays, on the display unit 15, the icon image 151*a* for connection processing and icon images 151*d* to 151*h* of the internal applications of a plurality of hands-free apparatuses 1. For example, the icon image 151*d* illustrated in FIG. 4 is an icon image 151*d* for starting a hands-free call by using the internal application. When the user presses the icon image 151*d* for starting a hands-free call, the reception unit 101 receives an operation for starting the hands-free call by using the internal application. In such a case, the hands-free call processing unit 105 makes an outgoing call or receives an incoming call.

The internal application of the hands-free apparatus 1 is not limited to an application for a hands-free call. The icon images 151*e* to 151*h* illustrated in FIG. 4 are icon images for starting various applications That can be implemented in the hands-free apparatus 1 without mirroring with the mobile phone 2. Furthermore, a screen, which includes a plurality of icon images 151*a* for connection processing and the icon images 151*d* to 151*h* of the internal applications of the plurality or hands-free apparatuses 1 illustrated in FIG. 4, is also referred to as a home screen 153. Furthermore, when the icon image 151*a* for connection processing is displayed on the home screen 153, the screen may also be referred to as an initial screen.

When the user presses the icon image 151*a* for connection processing displayed on the display unit 15 by the display control unit 102, the reception unit 101 receives a user's operation for giving instruction to make connection to the mobile phone 2 in the first connect on mode. The icon image 151*a* for connect on processing is an example of a first icon image in the present embodiment.

Furthermore, the mobile phone synchronization processing unit 104 makes connection to the mobile phone 2 in the first connection mode by the reception unit 101, the display control unit 102 replaces the icon image 151*a* for connection processing with an icon image for starting an external application and causes the display unit 15 to display the icon image for starting an external application. The icon image for starting an external application is an icon image different from the icon image 151*a* for connection processing, and is an example of a second icon image in the present embodiment. The icon image for starting an external application is, for example, an icon image for starting mirroring between the mobile phone 2 and the hands-free apparatus 1.

Figure 5A:
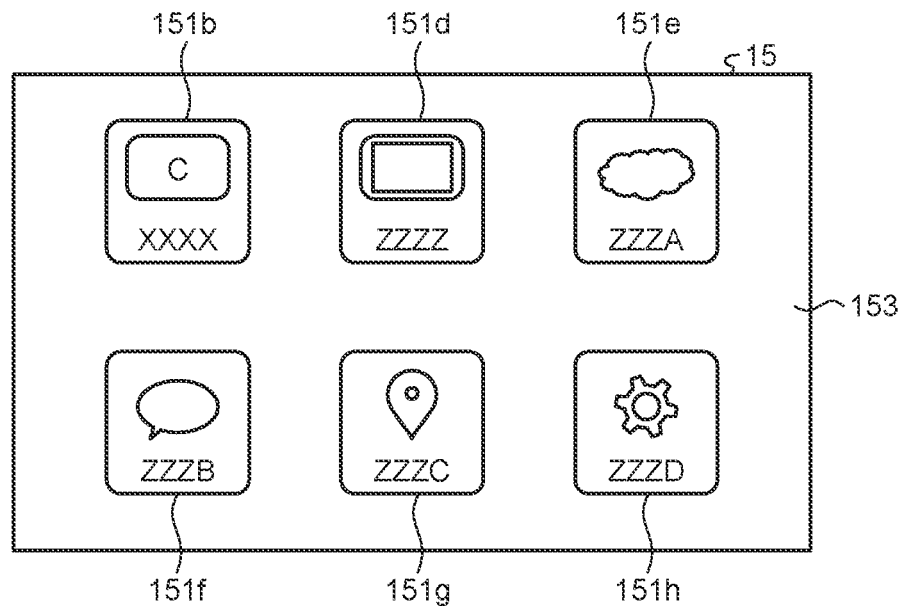
FIG. 5A is a diagram illustrating an example of an icon image for starting an external application according to an embodiment.

FIG. 5A is a diagram illustrating an example of an icon image 151*b* for starting an external application according to an embodiment. Furthermore, FIG. 5E is a diagram illustrating an example of another icon image 151*c* for starting an external application according to an embodiment. The display control unit 102 causes the display unit 15 to display, for example, different icon images 151*b* and 151*c* for starting an external application according to the type of an operating system (OS) of the mobile phone 2 to which the hands-free apparatus 1 is connected.

In the present embodiment, the external application connection refers to a state in which communication between the hands-free apparatus 1 and the mobile phone 2 subjected to authentication is established in the first connection mode in a wired or wireless manner. Furthermore, in the present embodiment, when the external application is started, it refers to a state in which the screen of the display unit 25 of the mobile phone 2 is projected onto the display unit 15 of the hands-free apparatus 1 by the external application.

Figure 6:
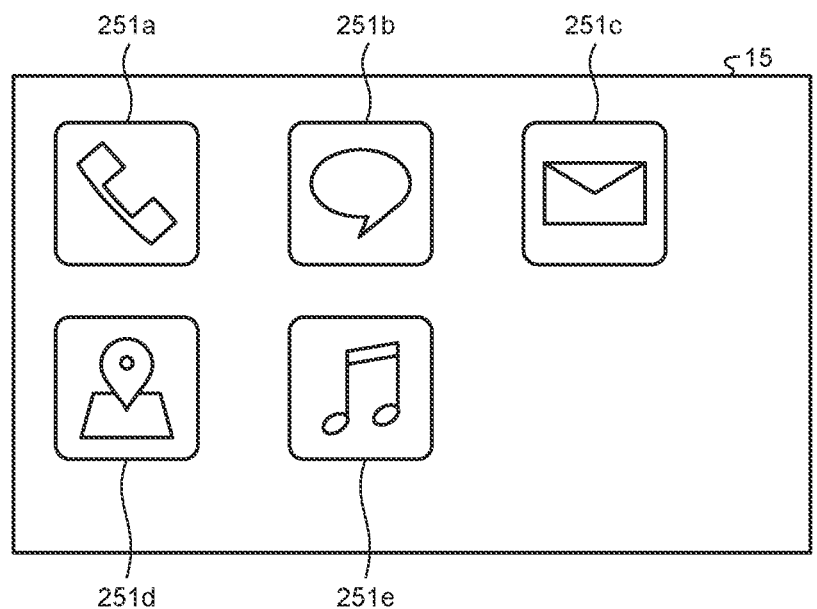
FIG. 6 is a diagram illustrating an example of a screen after the start of an external application according to an embodiment.

FIG. 6 is a diagram illustrating an example of a screen after the external application according to an embodiment is started. For example, when the icon image 151*b* or the icon image 151*c* for starting an external application is pressed, the display control unit 102 displays a list of icon images 251*a* to 251*e* for the applications of the mobile phone 2, which can be executed from the hands-free apparatus 1 by the external application. The list of the icon images 251*a* to 251e for the applications includes the icon image 251a for starting an external phone application.

When the user presses the icon image 251a for starting an external phone application on the screen illustrated in FIG. 6, the phone function of the mobile phone 2 is started. In such a case, the mobile phone synchronization processing unit 104 acquires an image displayed on the display unit 25 of the mobile phone 2. When the mobile phone synchronization processing unit 104 acquires the image displayed on the display unit 25 of the mobile phone 2. The display control unit 102 displays the acquired image on the display unit 15, thereby projecting the screen of the display unit 25 of the mobile phone 2 onto the display unit 15 of the hands-free apparatus 1.

Figure 7:
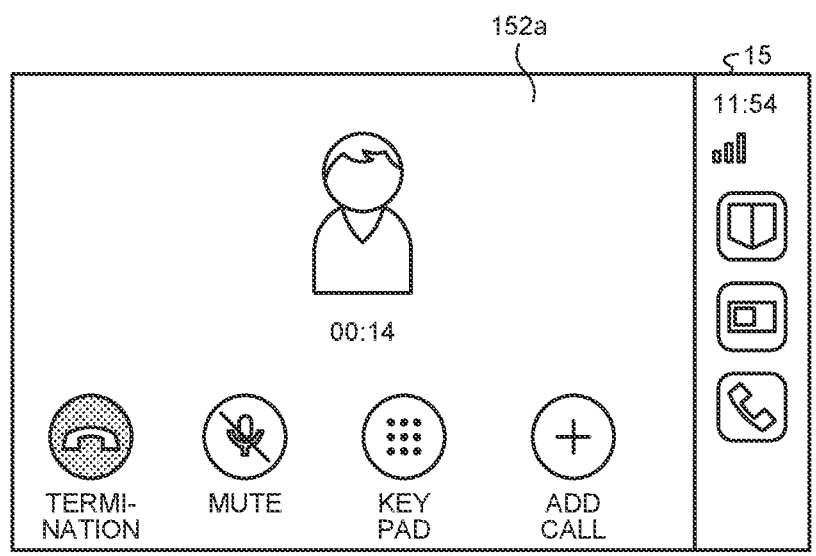
FIG. 7 is a diagram illustrating an example of a call screen displayed on a display unit of the hands-free apparatus during a call using an external phone application according to an embodiment.

FIG. 7 is a diagram illustrating an example of a call screen 152a displayed on the display unit 15 of the hands-free apparatus 1 during a call using the external phone application according to an embodiment. Furthermore, FIG. 8 is a diagram illustration another example of a call screen 152b displayed on the display unit 15 of the hands-free apparatus 1 during a call using the external phone application according to an embodiment.

Figure 8:
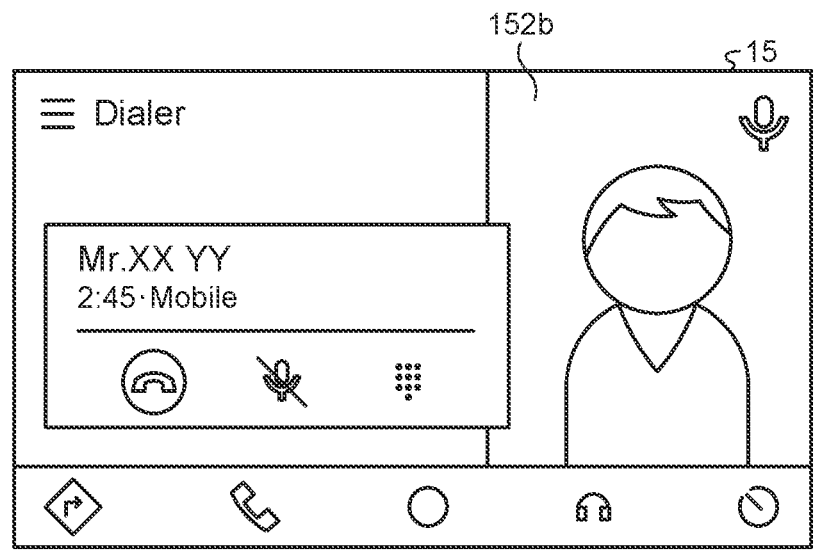
FIG. 8 is a diagram illustrating another example of a call screen displayed on the display unit of the hands-free apparatus during a call using an external phone application according to an embodiment.

In the call screens 152a and 152b illustrated in FIG. 7 and FIG. 8, the screen displayed on the display unit 25 of the mobile phone 2 is shared by the display unit 15 of the hands-free apparatus 1 by the mirroring function. For example, when the external phone application is a phone application having a normal voice call function, information or an image indicating a counterpart and a button, which can be operated for power-off or the like, are displayed on the call screen 152a as illustrated in FIG. 7. Furthermore, when the external phone application is a phone application having a videophone function of transmitting/receiving not only voice but also video in realtime, the video of a counterpart is displayed on the call screen 152b as illustrated in FIG. 8. Furthermore, the user can also perform an operation, such as turning off the mobile phone 2, on the screen of the display unit 15 illustrated in FIG. 7 and FIG. 8.

Furthermore, during a call using the function of the mobile phone 2 by the mobile phone synchronization processing unit 104, the display control unit 102 causes information on the ongoing call to be displayed on a first screen area that is a part of the display unit 15.

The first screen area is, for example, a header area on the screen of the display unit 15. The first screen area is not limited to the header area and may be a footer area or another area. Furthermore, a screen area other tan the first screen area on the screen of the display unit 15 is referred to as a second area.

Figure 9:
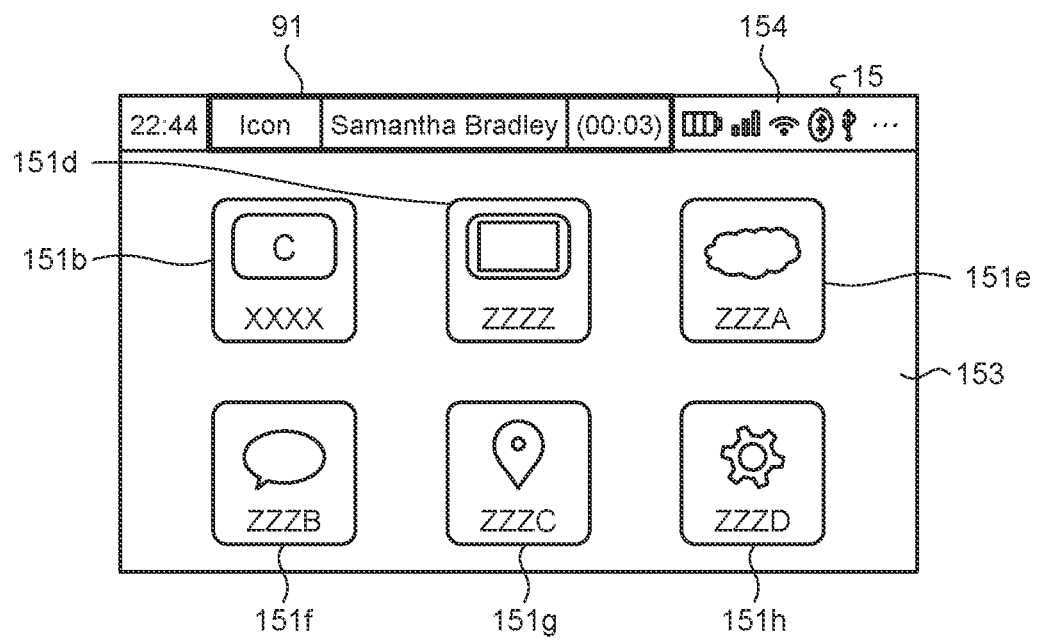
FIG. 9 is a diagram illustrating an example of displaying a header area on a screen of the display unit during a call using an external phone application according to an embodiment.

FIG. 9 is a diagram illustrating an example or displaying a header area 154 on the screen of the display unit 15 during a call using the external phone application according to an embodiment. In the example illustrated in FIG. 9, it is assumed that during a call using the external phone application, the display control unit 102 changes the call screens 152a and 152b to the home screen 153 by a user's operation. In such a case, the home screen 153 is displayed on the second area. The home screen 153 displays icon images or the like related to various functions of the hands-free apparatus 1, and does not include information on the ongoing call. When the call screens 152a and 152b are changed to another screen in this way, the display control unit 102 causes the information on the ongoing call to be displayed on the first screen area.

The information on the ongoing call includes, for example, the state of the ongoing call, a name or a phone number of a call counterpart, duration of the call, or the like. The information on the ongoing call may not include all of them. In the example illustrated in FIG. 9, the name of the call counterpart and the duration of the call are displayed in a display area 91 in the header area 154 on the screen of the display unit 15. The information on the ongoing call is not limited thereto, and may include information on call waiting such as a multi-call function or catch phone.

Referring now back to FIG. 2, the determination unit 103 determines whether the mobile phone 2 can be connected to the hands-free apparatus 1 in the first connection mode, on the basis of specified determination conditions. The specified determination conditions are, for example, the type and version of the OS of the mobile phone 2. Details of the determination process performed by the determination unit 103 will be described below.

Furthermore, the transfer protocol control unit 106 makes connection to the mobile phone 2 by a communication protocol based on the PBAP so that data can be transferred. More specifically, the transfer protocol control unit 106 makes connection to the mobile phone 2 by the communication protocol based on the PBAP by controlling the Bluetooth communication unit 13, In the communication protocol based on the PBAP, the outgoing call history data 261, the incoming call history data 262, the missed call history data 263, and the phone book data 264 stored in the mobile phone 2 can be transferred to the hands-free apparatus 1.

Furthermore, when the mobile phone synchronization processing unit 104 makes a call using the external phone application, the data acquisition unit 107 acquires the outgoing call history data 261 and the incoming call history data 262 including a phone number of a call counterpart from the mobile phone 2 after the call is terminated on the mobile phone 2. The data acquisition unit 107 stores the acquired outgoing call history data 261 and incoming call history data 262 in the working memory 16 or the storage memory 17 as the outgoing call history data 161 and the incoming call history data 162. The data acquisition unit 107 may acquire only history related to an immediately previous call from the outgoing call history data 261 and the incoming call history data 262 stored in the storage memory 27 of the mobile phone 2, or all of them.

Furthermore, it is assumed that the mobile phone 2 and the hands-free apparatus 1 are connected by the transfer protocol control unit 106 before data acquisition by the data acquisition unit 107. The data acquisition unit 107 is an example of an acquisition unit in the present embodiment.

Furthermore, when outgoing call conditions are satisfied, the emergency call processing unit 108 makes a call to the outgoing call destination of an emergency call via the mobile phone 2 by using the HFP-based connection. The hands-free call processing unit 105 may also serve as the emergency call processing unit 108.

The emergency call may be, for example, a call used in a predetermined emergency call system constructed by a public institution such as the country. In such a case, a phone number for the emergency call may be predetermined, for example, by the public institution or the like. An example of the emergency call system is an eCall system constructed in Europe, and in such a case, the phone number for the emergency call is a predetermined number common to Europe (for example, "112"). Alternatively, the emergency call may be a call used in a dedicated call system introduced by a company (for example, an automobile manufacturer, an insurance company, or the like). In such a case, the emergency call may be designed to be available by a user such as a customer of the company, and the phone number for the emergency call may be predetermined by the company. For example, the destination of the emergency call may be a road service provider or the like. Furthermore, the outgoing call conditions of the emergency call may be based on rules established according to the country or region. Furthermore, the emergency call may be sent by a user's operation.

Next, the flow of processing for starting the external phone application executed by the hands-free apparatus 1 of the present embodiment configured as described above will be described.

Figure 10:
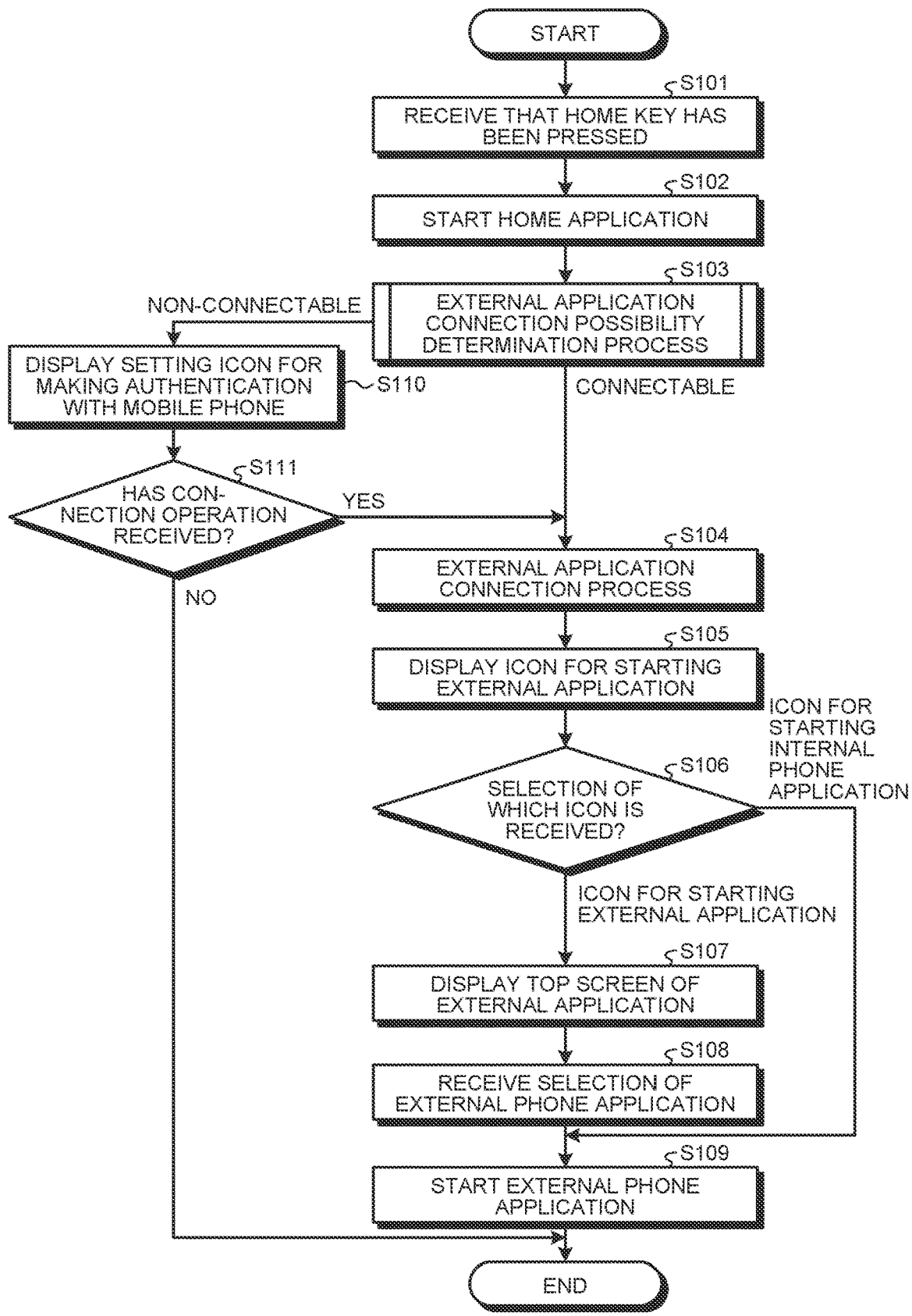
FIG. 10 is a flowchart illustrating an example of the flow of processing for starting an external phone application executed by the hands-free apparatus according to an embodiment.

FIG. 10 is a flowchart illustrating an example of the flow of processing for starting the external phone application executed by the hands-free apparatus 1 according to an embodiment.

First, the reception unit 101 receives that a HOME key has been pressed by the user (S101). The HOME key is an icon image or a physical button that allows a user's operation for displaying the home screen 153 on the display unit 15 of the hands-free apparatus 1 to be input.

Then, when the reception unit 101 receives that the HOME key has been pressed by the user, a HOME application is started (S102). The HOME application is a function of providing an execution screen of various functions that can be executed by the hands-free apparatus 1, and for example, allows the functions of the determination unit 103, the mobile phone synchronization processing unit 104, the hands-free call processing unit 105, the transfer protocol control unit 106, and the data acquisition unit 107 of the hands-free apparatus 1 to be executable.

In such a case, the display control unit 102 causes the display unit 15 to display the home screen 153.

Then, the determination unit 103 performs the external application connection possibility determination process (S103). The external application connection possibility determination process will be described with reference to FIG.

When it is determined that the hands-free apparatus 1 and the mobile phone 2 can be connected using the external application ("connectable" at S103) as a result of the external application connection possibility determination process, the mobile phone synchronization processing unit 104 performs an external application connection process of connecting the hands-free apparatus 1 and the mobile phone 2 in the first connection mode (S104).

Figure 5B:
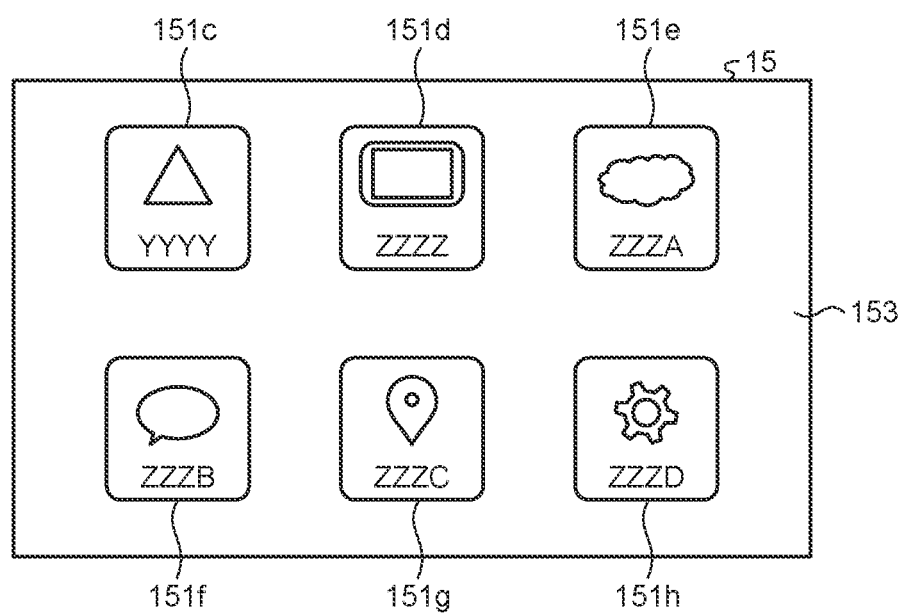
FIG. 5B is a diagram illustrating an example of another icon image for starting an external application according to an embodiment.

Then, as described with reference to FIGS. 5A and 5B, the display control unit 102 displays the icon images 151b and 151c for starting an external application on the display unit 15 (S105). At this time, the display control unit 102 displays the icon image 151d for starting a hands-free call by using the internal application on the display unit 15.

Then, the reception unit 101 determines which of the icon image 151b for starting an external application, the icon image 15ic for starting an external application, and the icon image 151d for starting a hands-free call, selection of which is received from the user (S106).

When the reception unit 101 receives the selection of the icon image 151b for starting an external application or the icon image 151c for starting an external application ("icon for starting an external application" at S106), the display control unit 102 causes the display unit 15 to display the top screen of the external application as described with reference to FIG. 6 (S107).

Then, when the reception unit 101 receives the selection of the external phone, application on the top screen of the external application (3108), the mobile phone synchronization processing unit 104 starts the external phone application of the mobile phone 2 (3109). That is, this processing starts the phone function of the mobile phone 2. Thereafter, the screen of the display unit 25 of the mobile phone 2 is projected onto the hands-free apparatus 1 by the mobile phone synchronization processing unit 104 and the display control unit 102. With this, the process of the flowchart ends.

Furthermore, in the flowchart, even when the reception unit 101 receives the selection of the icon image 151d for starting a hands-free call ("icon for starting an external application" at S106), the process proceeds to S109 and the mobile phone synchronization processing unit 104 starts the external phone function. Note that when the reception unit 101 receives the selection of the icon image 151d for starting a hands-free call, the hands-free call processing unit 105 may start an HFT-based call function without staring the external phone function.

Furthermore, when it is determined that the hands-free apparatus 1 and the mobile phone 2 is not connectable using the external application ("non-connectable" at S103) as a result of the external application connection possibility determination process, the display control unit 102 causes the display unit 15 to display the icon image 151a for connection processing as described with reference to FIG. 4 (S110). The icon image 151a for connection processing is also referred to as a setting icon for making authentication with the mobile phone 2.

Then, when the reception unit 101 receives that the icon image 151a for connection processing has been pressed by the user and receives a subsequent connection operation ("Yes" at Sill), the process proceeds to S104. In such a case, the display control unit 102 hides the on image 151a for connection processing, and causes the display unit 15 to display the icon images 151b and 151c for starting an external application.

Furthermore, when the reception unit 101 receives no user's connection operation ("No" at S111), the process of the flowchart ends.

Figure 11:
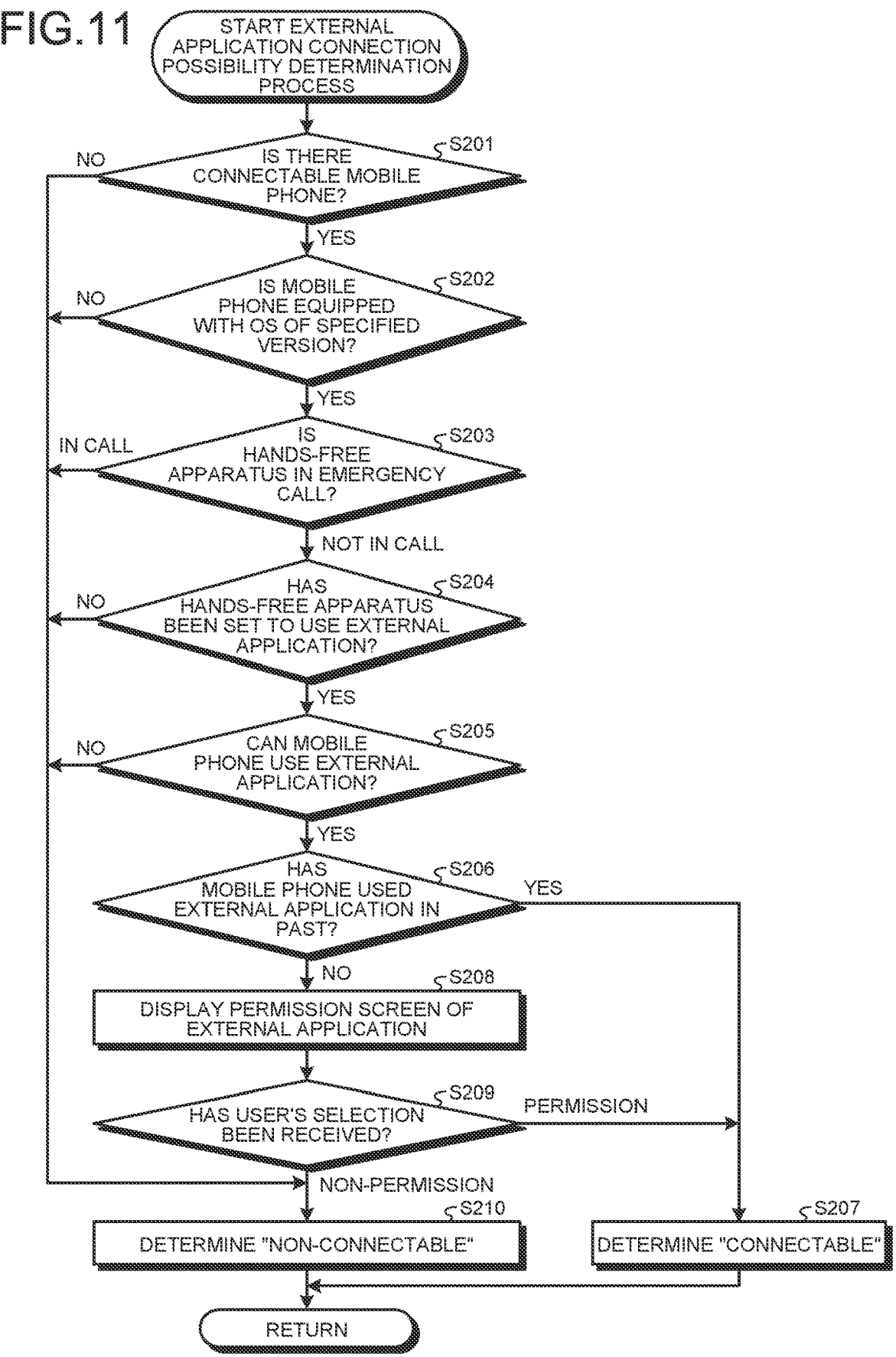
FIG. 11 is a flowchart illustrating an example of the flow of an external application connection possibility determination process according to an embodiment.

Next, the external application connection possibility determination process will be described. FIG. 11 is a flowchart illustrating an example of the flow of the external application connection possibility determination process according to an embodiment.

First, the determination unit 103 determines whether a connectable mobile phone 2 exists (S201). At this step, the determination unit 103 determines whether the connectable mobile phone 2 exists, on the basis of whether the type of the OS of the mobile phone 2, which is located in the wireless coverage area of the hands-free apparatus 1 or is connected to the hands-free apparatus 1 by wire, is a type corresponding to the external application.

For example, when the type of the OS of the mobile phone 2, which is located in the wireless coverage area of the hands-free apparatus 1 or is connected to the hands-free apparatus 1 by wire, is the type corresponding to the external application, the determination unit 103 determines that the connectable mobile phone 2 exists ("Yes" at S201). In such a case, the determination unit 103 determines whether the mobile phone 2 is equipped with an OS of a specified version (S202). That is, when the type of the OS satisfies the conditions, the determination unit 103 determines the version of the OS.

When it is determined that the mobile phone 2 is equipped with the OS of a specified version ("Yes" at S202), the determination unit 103 determines whether the hands-free apparatus 1 side is in an emergency call by the emergency call processing unit 108 (S203).

When the hands-free apparatus 1 is not in the emergency call ("not in a call" at S203), the determination unit 103 determines whether the hands-free apparatus 1 has been set to use the external application (S204). It is assumed that whether the hands-free apparatus 1 can use the external application is set by, for example, a user's manual operation.

When the hands-free apparatus 1 has been set to use the external application. ("Yes" at S204), the determination unit 103 determines whether the mobile phone 2 can use the external application (S205).

For example, when a specified application, such as Car-Play (registered trademark) or Android Auto (registered trademark), has been installed in the mobile phone 2, the determination unit 103 determines that the mobile phone 2 can use the external application ("Yes" at S205). In such a case, the determination unit 103 determines whether the mobile phone 2 has been connected to the hands-free apparatus 1 by using the external application in the past (S206).

When it is determined that the mobile phone 2 has been connected to the hands-free apparatus 1 by using the external application in the past ("Yes" at S206), the determination unit 103 determines that the hands-free apparatus 1 and the mobile phone 2 can be connected (S207). Then, the process returns to the flowchart of FIG. 10.

Furthermore, when it is determined that the mobile phone 2 has never been connected to the hands-free apparatus 1 by using the external application in the past ("No" at S206), the determination unit 103 causes the display unit 15 to display a permission screen of the external application (S208). The permission screen of the external application is a screen on which the user can input permission for cooperation between the mobile phone 2 and the hands-free apparatus 1 using the external application, that is, screen sharing between the hands-free apparatus 1 and the mobile phone 2 and the execution of the function of the mobile phone 2 by an operation of the hands-free apparatus 1. The permission screen of the external application may be displayed on the display unit 25 of the mobile phone 2.

Then, the determination unit 103 receives a user's selection of "permission" or "non-permission" (S209). When the use's selection is "permission", the process proceeds to S207.

Furthermore, when any one of the determination processes of S201, S202, S204, and S205 is "No" when the hands-free apparatus 1 is in the emergency call in the determination process of S203, or when the user's selection is "non-permission" at S209, the determination unit 103 determines that the hands-free apparatus 1 and the mobile phone 2 are not connectable. Then, the process returns to the flowchart of FIG. 10.

Next, display of the outgoing/incoming call history stored in the hands-free apparatus 1 and the mobile phone 2 will be described with reference to FIG. 12 and FIG. 13.

Figure 12:
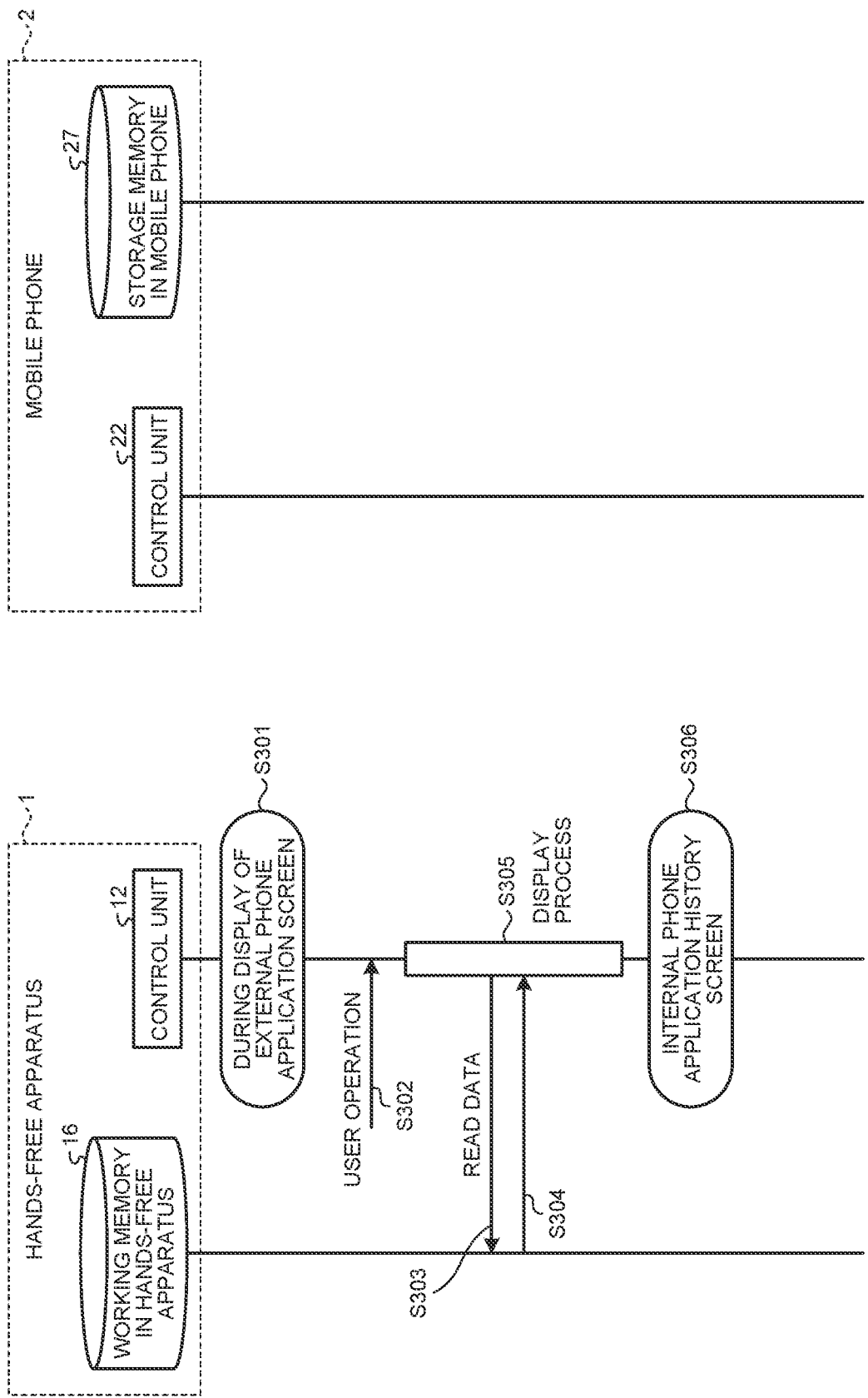
FIG. 12 is a sequence diagram illustrating an example of the flow of displaying outgoing/incoming call history by an internal phone application according to an embodiment.

FIG. 12 is a sequence diagram illustrating an example of the flow of displaying the outgoing/incoming call history by using the internal phone application according to an embodiment. As a premise of the process of FIG. 12, it is assumed that the hands-free apparatus 1 and the mobile phone 2 are not connected in the first connection mode.

At the beginning of this sequence diagram, the display control unit 102, which is a function implemented by the control unit 12 of the hands-free apparatus 1, causes the display unit 15 to display a call screen using the internal phone application (S301).

Then, the reception unit 101, which is a function of the control unit 12, receives a user's operation for displaying an outgoing/incoming call history screen (S302).

In such a case, the display control unit 102 reads the outgoing call history data 161 and the incoming call history data 162 stored in the memory in the hands-free apparatus 1, for example, the working memory 16 (S303 and S304).

Then, the display control unit 102 performs a display process of generating the outgoing/incoming call history screen including the read outgoing call history data 161 and incoming call history data 162 (S305).

Then, the display control unit 102 causes the display unit 15 to display the outgoing/incoming call history screen of the internal phone application (S306). The process illustrated in FIG. 12 is completed in the hands-free apparatus 1 and the outgoing call history data 261 and the incoming call history data 262 stored in the mobile phone 2 are not read. Although FIG. 12 illustrates the outgoing/incoming call history screen as an example, even in the display of a phone book using the internal phone application, the process is completed in the hands-free apparatus 1 and the phone book data 254 stored in the mobile phone 2 is not read.

Figure 13:
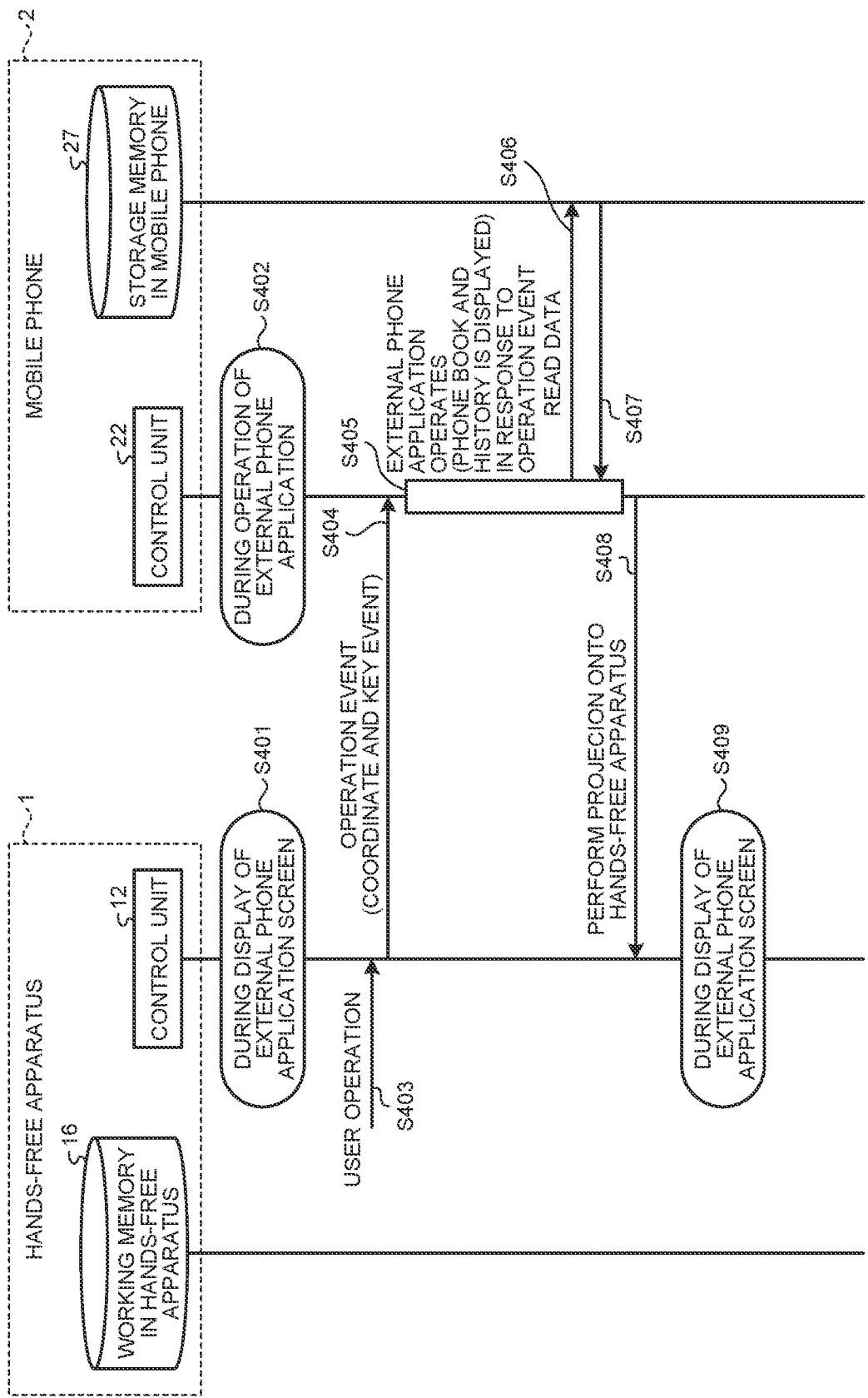
FIG. 13 is a sequence diagram illustrating an example of the flow of displaying outgoing/incoming call history by an external phone application according to an embodiment.

Furthermore, FIG. 13 is a sequence diagram illustrating an example of the flow of displaying outgoing/incoming call history by the external phone application according Co an embodiment. As a premise of the process of FIG. 13, it is assumed that the hands-free apparatus 1 and the mobile phone 2 are connected in the first connection mode.

At the beginning of this sequence diagram, the display control unit 102, which is a function implemented by the control unit 12 of the hands-free apparatus 1, causes the display unit 15 to display the screen of the external phone application (S401). Furthermore, the external phone application is operating in the control unit 22 of the mobile phone 2 (S402).

Then, the reception unit 101, which is a function of the control unit 12, receives a user's operation for displaying an outgoing/incoming call history screen (S403).

Then, the mobile phone synchronization processing unit 104, which is a function of the control unit 12, transmits the coordinates of a touch position received by the reception unit 101 and a key event to the mobile phone 2 as an operation event (S404).

Then, the control unit 22 of the mobile phone 2 receives the operation event transmitted from the hands-free apparatus 1 and operates the external phone application, that is, the phone function of the mobile phone 2 (S405). The control unit 22 reads the outgoing call history data 261 and the incoming call history data 262 from the storage memory 27 in the mobile phone 2 (S406 and S407), and causes the display of the mobile phone 2 to display the outgoing/incoming call history screen. Note that the same applies not only to the display of the outgoing call history data 261 and the incoming call history data 262, but also to the display of the phone book data 264.

Then, the mobile phone synchronization processing unit 104 acquires the outgoing/incoming call history screen displayed on the display of the mobile phone 2, in order to project the outgoing/incoming call history screen onto the display unit 15 of the hands-free apparatus 1 (S408). Then, the display control unit 102 displays the outgoing/incoming call history screen displayed on the display of the mobile phone 2 and acquired by the mobile phone synchronization processing unit 104, on the display unit 15 as an external phone application screen (S409).

As illustrated in FIG. 13, in the case where the external phone application is used, when the outgoing/incoming call history screen or the phone book screen is displayed, the outgoing call history data 261, the incoming call history data 262, and the phone book data 264 stored in the mobile phone 2 are used instead of the outgoing call history data 161, the incoming call history data 162, and the phone book data 164 in the hands-free apparatus 1. Therefore, the display control unit 102 can display, for example, a number of outgoing/incoming call history data or phone book data, which are not retainable in the working memory 16 or the storage memory 17 of the hands-free apparatus 1 due to the memory capacity thereof, by using the outgoing call history data 261, the incoming call history data 262, and the phone book data 264 in the mobile phone 2.

Figure 14:
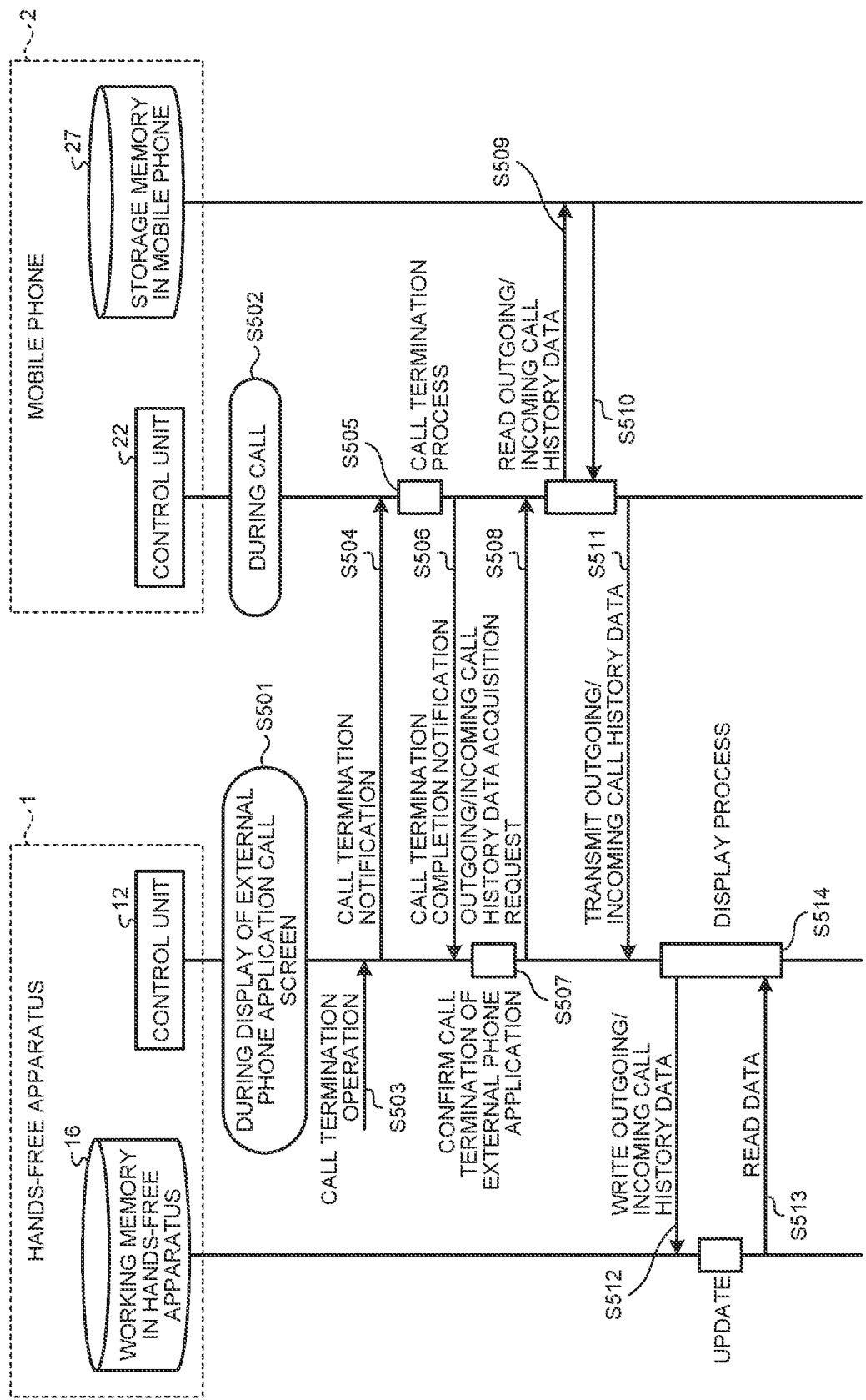
FIG. 14 is a flowchart illustrating an example of the flow of processing for updating outgoing/incoming call history data at the end of an external phone application call according to an embodiment.

Furthermore, FIG. 14 is a flowchart illustrating an example of the flow of processing for updating outgoing/incoming call history data at the end of an external phone application call according to an embodiment. As a premise of the process of FIG. 14, it is assumed that the hands-free apparatus 1 and the mobile phone 2 are connected in the first connection mode and are in a call by the phone function of the mobile phone 2.

At the beginning of this sequence diagram, the display control unit 102, which is a function implemented by the control unit 12 of the hands-free apparatus 1, causes the display unit 15 to display the call screens 152a and 152b of the external phone application (S501). Furthermore, the control unit 22 of the mobile phone 2 is in a call by the external phone application (S502).

Then, when the reception unit 101 receives a user's call termination operation (S503), the mobile phone synchronization processing unit 104 transmits a call termination notification to the mobile phone 2 (S504).

In such a case, the control unit 22 of the mobile phone 2 performs a call termination process of terminating the call (S505). Then, the control unit 22 of the mobile phone 2 transmits a call termination completion notification indicating the termination of the call to the hands-free apparatus 1 (S506).

The mobile phone synchronization processing unit 104, which is executed by the control unit 12 of the hands-free apparatus 1, confirms the call termination of the external phone application by the call termination completion notification (S507).

Then, the data acquisition unit 107, which is executed by the control unit 12 of the hands-free apparatus 1, requests the mobile phone 2 to transmit the outgoing call history data 261 and the incoming call history data 262 (S508).

In such a case, the control unit 22 of the mobile phone 2 reads the outgoing call history data 261 and the incoming call history data 262 from the storage memory 27 in the mobile phone 2 (S509 and S510). In such a case, the control unit 22 may read only outgoing/incoming call history data related to the destination of an immediately previous call, or read all items.

Then, the control unit 22 of the mobile phone 2 transmits the read outgoing call history data 261 and incoming call history data 262 to the hands-free apparatus 1 (S511).

Then, the data acquisition unit 107, which is executed by the control unit 12 of the hands-free apparatus 1, acquires the outgoing call history data 261 and the incoming call history data 262 including the phone number of the destination of the call from the mobile phone 2. Furthermore, the data acquisition unit 107 stores the acquired outgoing call history data 261 and incoming call history data 262 in the working memory 16 or the storage memory 17 (S512). For example, when only the outgoing/incoming call history data related to the immediately previous call is acquired, the data acquisition unit 107 adds the acquired outgoing/incoming call history data to the outgoing call history data 161 or the incoming call history data 162 of the working memory 16 or the storage memory 17, thereby updating the outgoing call history data 161 or the incoming call history data 162. The update method is not limited thereto.

Then, the display control unit 102 reads the updated outgoing call history data 161 or incoming all history data 162 from the working memory 16 or the storage memory 17 (S513), and performs a display process of causing the display unit 15 to display an outgoing/incoming call history screen (S514). With this, the process of the sequence diagram ends.

Next, the flow of processing when the hands-free apparatus 1 is connected to another mobile phone during a call via the mobile phone 2 using the internal phone application such as HFT will be described.

Figure 15:
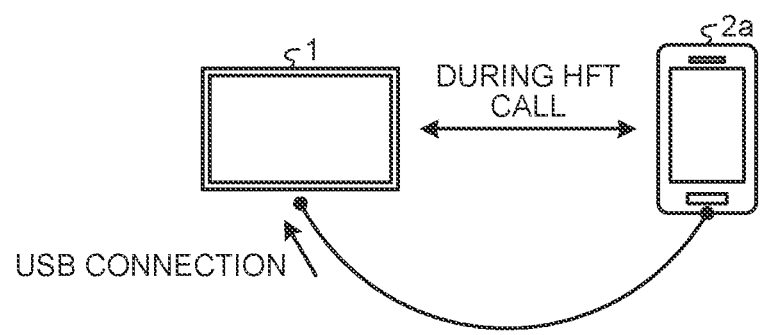

FIG. 15 is a diagram illustrating an example of a connection pattern between the hands-free apparatus 1 according to an embodiment and one mobile phone 2a. The example illustrated in FIG. 15 shows a case where the hands-free apparatus 1 and the mobile phone 2a are connected by HFP-based Bluetooth (registered trademark) and are in a call using the internal phone application such as HFT. In FIG. 15, the mobile phone 2a during a call is connected to the hands-free apparatus 1 by a USB cable. In such a case, the mobile phone 2a can be connected to the hands-free apparatus 1 not only in the second connection mode such as HFP, but also in the first connection mode.

Figure 16:
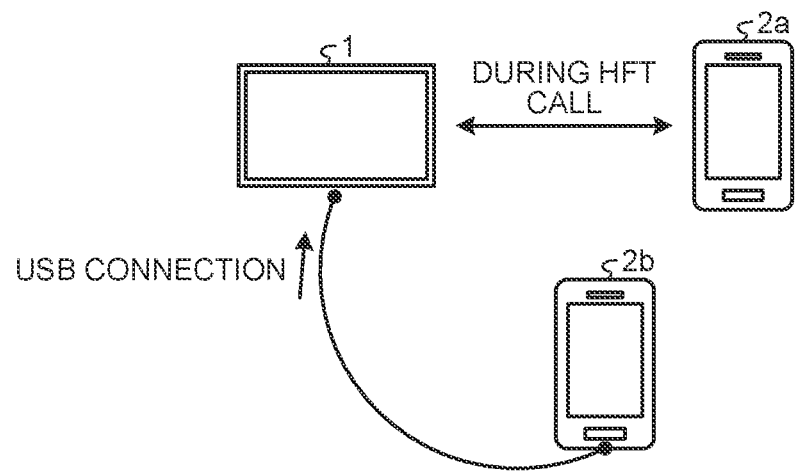
FIG. 16 is a diagram illustrating an example of a connection pattern between the hands-free apparatus 1 according to an embodiment and two mobile phones 2a and 2b.

Furthermore, FIG. 16 is a diagram illustrating an example of a connection pattern between the hands-free apparatus 1 according to an embodiment and two mobile phones 2a and 2b. In example illustrated in FIG. 16, the other mobile phone 2b different from the mobile phone 2a during a call is connected to the hands-free apparatus 1 by a USB cable.

In the case where the mobile phone 2a during a call is further connected by a USB cable as illustrated in FIG. 15 and the case where the other mobile phone 2b different from the mobile phone 2a during a call is connected to the hands-free apparatus 1 by a USB cable, processes to be performed are different.

Figure 17:
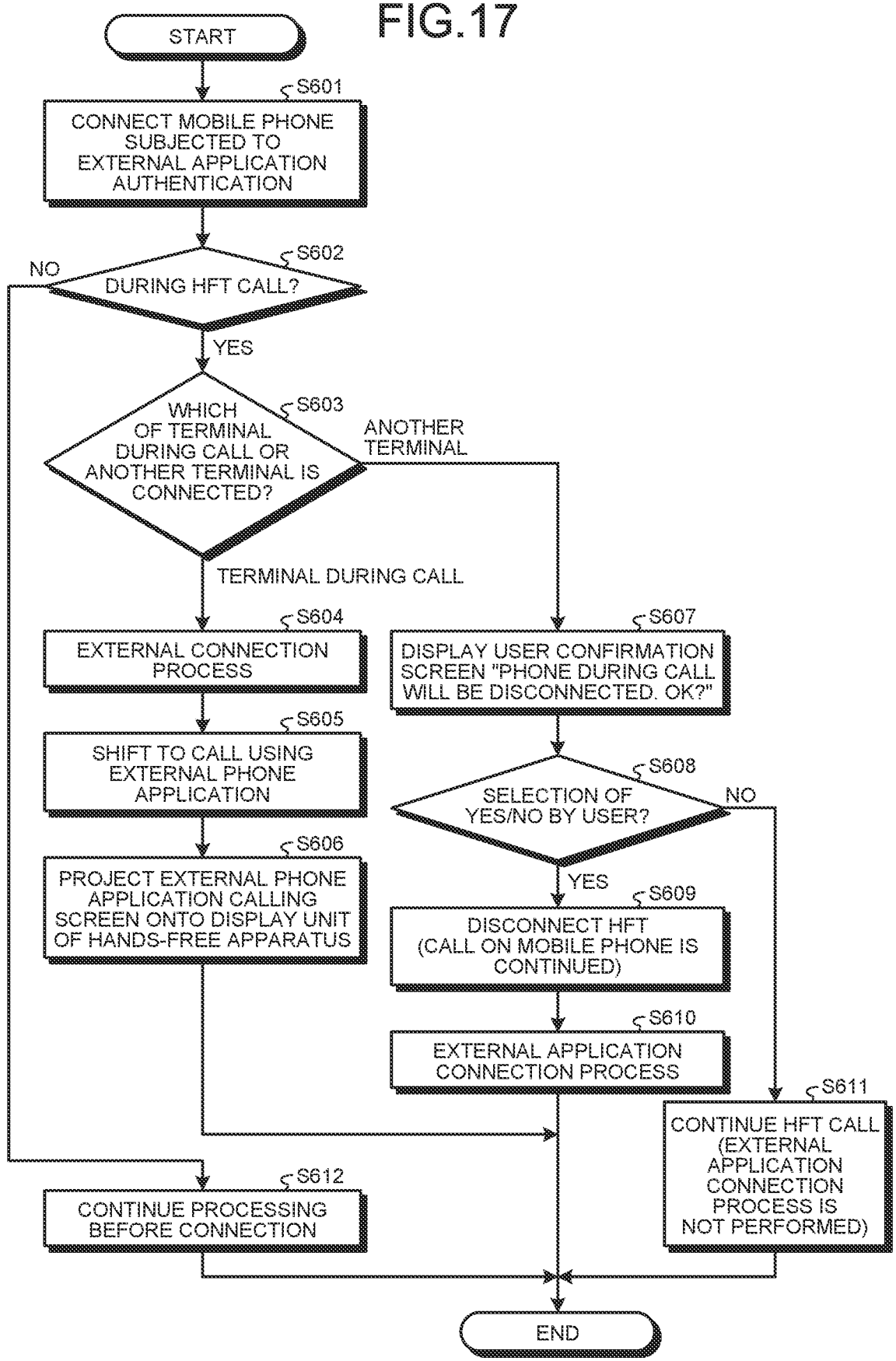
FIG. 17 is a flowchart illustrating an example of the flow of a connection process during a call using an internal phone application such as HFT according to an embodiment.

FIG. 17 is a flowchart illustrating an example of the flow of a connection process during a call using the internal phone application such as HFT according to an embodiment. The process of the flowchart is performed in the background.

First, the mobile phone 2a or mobile phone 2b subjected to external application authentication is connected by a user's operation (S601). For example, in the case of FIG. 15 and FIG. 16, the mobile phone 2a or the mobile phone 2b is connected to the hands-free apparatus 1 by a USB cable.

Then, the determination unit 103 determines whether the hands-free apparatus 1 is in an HFT call using the internal application (S602).

When it is determined that the hands-free apparatus 1 is HFP-connected to the mobile phone 2a and is in the HFT call using the internal application ("Yes" at S602), the determination unit 103 determines whether a mobile phone newly connected by a USB cable is the mobile phone 2a during a call or another mobile phone (S603).

When it is determined that the newly connected mobile phone is the mobile phone 2a during a call ("terminal a call" at S603), the determination unit 103 performs a process of making connection to the mobile phone 2a via a USB cable in the first connection mode in which the external application can be used (S604). That is, when the hands-free apparatus 1 is connected to the mobile phone 2a in the first connection mode during a call made by the hands-free call processing unit 105 via the mobile phone 2a, the mobile phone synchronization processing unit 104 switches the call using the phone function of the hands-free apparatus 1 into a call using the phone function of the mobile phone 2a.

Furthermore, the mobile phone synchronization processing unit 104 shifts the call using the internal phone application such as HFT to a call using the external phone application (S605). In such a case, the mobile phone synchronization processing unit 104 switches the type of a calling method while continuing the ongoing call.

Then, the display control unit 102 projects the external phone application calling screen the onto the display unit. 15 of the hands-free apparatus 1 (S606). With this, the process of the flowchart ends.

Furthermore, when the determination unit 103 determines that the newly connected mobile phone is not the mobile phone 2a during a call but another mobile phone 2b ("another terminal in a call" at S603), the display control unit 102 causes the display unit 15 to display a user confirmation screen (S607). The user confirmation screen is, for example, a screen that displays a message "Phone during a call will be disconnected. OK!".

Then, the reception unit 101 receives a user's selection on the user confirmation screen. The determination unit 103 determines whether the reception unit 101 has received Yes or No (S608).

When the user has selected Yes ("Yes" at S608), the hands-free call processing unit 105 disconnects the HFT (S609). At this time, the call on the hands-free apparatus 1 is terminated, but the call on the mobile phone 2a is continued.

Then, the mobile phone synchronization processing unit 104 performs an external application connection process between the hands-free apparatus 1 and another mobile phone 2b newly connected by a USB cable (S610). That is, when the hands-free apparatus 1 is connected to the other mobile phone 2b different from the mobile phone 2a in the first connection mode during a call on the mobile phone 2a connected in the second connection mode, the hands-free call processing unit 105 disconnects or continues the connection between the mobile phone 2a and the hands-free apparatus 1 in the first connection mode in accordance with a user's operation. With this, the process of the flowchart ends.

Furthermore, when the user has selected No ("No" at S608) on the user confirmation screen, the hands-free call processing unit 105 continues the HFT call without disconnecting connection with the HFT (S611). In such a case, the external application connection process is not performed between the hands-free apparatus 1 and the other mobile phone 2b connected by a USB cable. With this, the process of the flowchart ends.

Furthermore, when the determination unit 103 determines that the hands-free apparatus 1 is not in the HFT call using the internal application ("No" at S602), the hands-free apparatus 1 continues processing before the hands-free apparatus 1 is connected to the mobile phone 2a or the mobile phone 2b (S612). Even in such a case, the process of the flowchart ends.

In FIG. 15 to FIG. 17, new connection is made by a USB cable; however, it may be wireless connection such as Wi-Fi or Bluetooth (registered trademark).

Next, a process when communication between the hands-free apparatus 1 and the mobile phone 2 is cut off while the external phone application is running will be described. For example, communication between the hands-free apparatus 1 and the mobile phone 2 may be cut off due to some troubles or the like while the external phone application is running.

Figure 18:
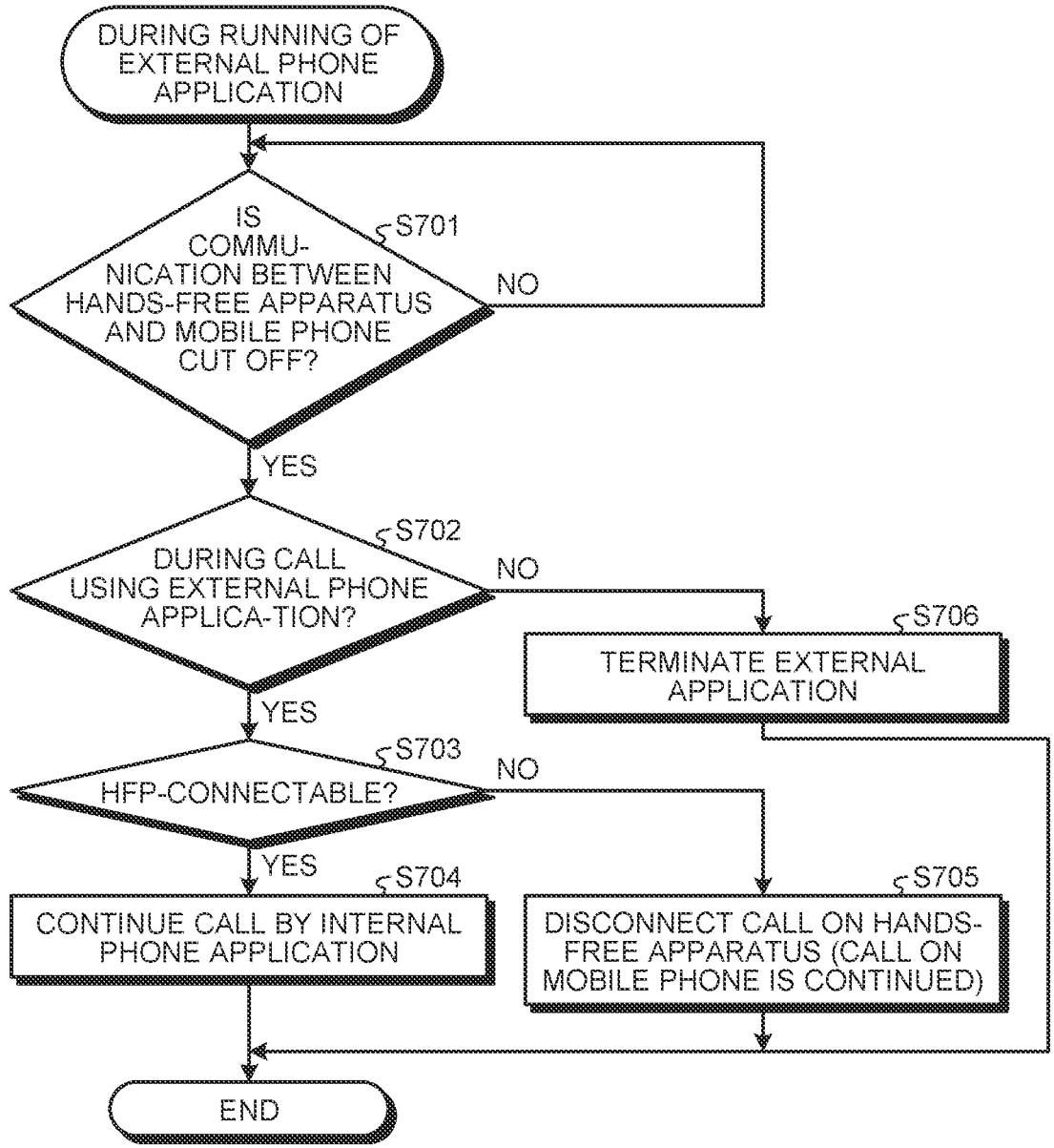
FIG. 18 is a flowchart illustrating an example of a processing flow at the time of cut off of communication with a mobile phone according to an embodiment.

FIG. 18 is a flowchart illustrating an example of a processing flow at the time of cut off of communication with the mobile phone 2 according to an embodiment. As a premise of starting the flowchart, the hands-free apparatus 1 is in a state of being communicably connected to the mobile phone 2 by the external application, the external phone application is running in the mobile phone 2, and the screen of the external phone application is projected onto the hands-free apparatus 1.

Then, the determination unit 103 determines whether communication between the hands-free apparatus 1 and the mobile phone 2 is cut off (S702). When the determination unit 103 determines that the communication with the mobile phone 2 is not cut off ("No" at S702), the process of S702 is repeated.

When the determination unit 103 determines that the communication with the mobile phone 2 is cut off ("Yes" at S702), the determination unit 103 determines whether the hands-free apparatus 1 and the mobile phone 2 are in a call using the external phone application (S702).

When it is determined that the hands-free apparatus 1 and the mobile phone 2 are in a call using the external phone application ("Yes" at S702), the determination unit 103 determines whether the hands-free apparatus 1 and the mobile phone 2 can be HFP-connected (S703).

When the determination unit 103 determines that the hands-free apparatus 1 and the mobile phone 2 can be HFP-connected ("Yes" at S703), the hands-free call processing unit 105 HFP-connects the hands-free apparatus 1 and the mobile phone 2, and continues the call using the mobile phone 2 by the internal phone application (S704).

Furthermore, when the determination unit 103 determines that the hands-free apparatus 1 and the mobile phone 2 is not HFP-connectable ("No" at S703), the mobile phone synchronization processing unit 104 disconnects the call on the hands-free apparatus 1 (S705). In such a case, the mobile phone 2 continues the call.

Furthermore, when the determination unit 103 determines that the hands-free apparatus 1 and the mobile phone 2 are not in the call using the external phone application ("Yes" at S706), the mobile phone synchronization processing unit 104 terminates the external phone application (S706).

Next, a data transfer process at the time of first connection between the hands-free apparatus 1 and the mobile phone 2 will be described.

Figure 19:
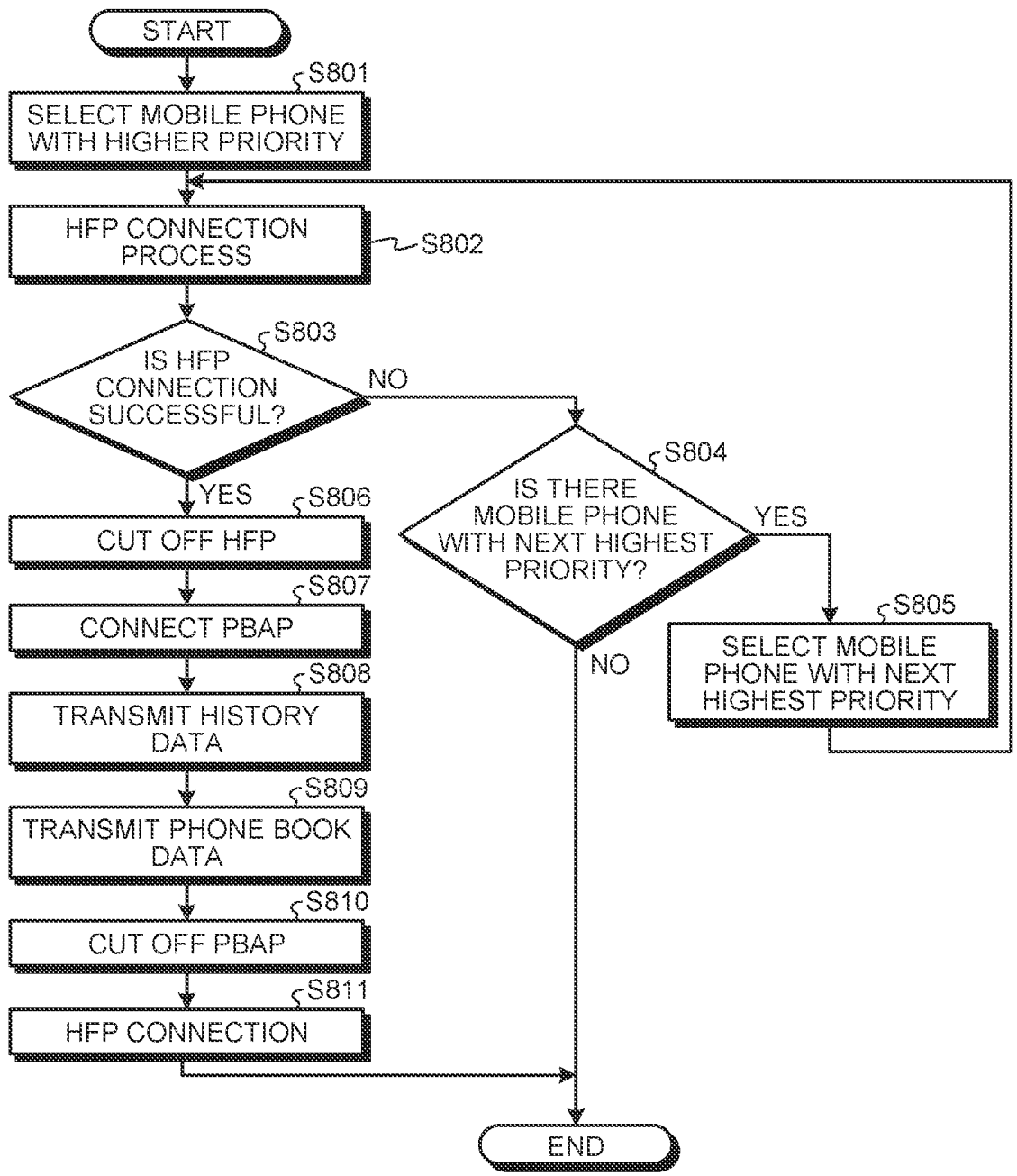
FIG. 19 is a flowchart illustrating an example of a processing flow of the hands-free apparatus according to an embodiment.

FIG. 19 is a flowchart illustrating an example of a processing flow of the hands-free apparatus 1 according to an embodiment. As a premise of the flowchart, it is assumed that a plurality of connection information is stored in the working memory 16 or the storage memory 17 of the hands-free apparatus 1 in correlation with connection priority. For example, since some drivers may own a plurality of mobile phones 2, it is assumed that the mobile phones 2 can be registered in the hands-free apparatus 1 in this way. In the present embodiment, the phone book data 164 and 264 may not be, transferred, but in the flowchart, an example in which the phone book data 164 and 264 are also transferred will be described.

First, the hands-free call processing unit 105 selects a mobile phone 2 with higher priority as a communication connection target in HFP-based wireless communication (S601). In the present example, first, HFP-based initial communication is automatically attempted and connection is stated without initially making PBAP-based communication connection.

Next, the hands-free call processing unit 105 performs a process of automatically connecting the HFP-based initial communication to the selected mobile phone 2 (S802). Furthermore, the hands-free call processing unit 105 determines whether the HFP-based wireless communication connection is successful (S803).

When it is determined that the HFP-based wireless communication connection is not successful ("No" at S803), the hands-free call processing unit 105 determines whether a mobile phone 2 with the next highest priority exists (S804).

When it is determined that the mobile phone 2 with the next highest priority exists ("Yes" at S804), the hands-free call processing unit 105 selects the mobile phone 2 with the next highest priority as a wireless communication connection target (S805), and returns to the process of S802.

Furthermore, when the hands-free call processing unit 105 determines that the mobile phone 2 with the next highest priority does not exist ("No" at S804), the process of the flowchart ends.

Furthermore, when it is determined that the HFP-based wireless communication connection is successful ("Yes" at S803), the hands-free all processing unit 105 automatically cuts off the connected HFP-based wireless communication (S806).

Then, the transfer protocol control unit 106 automatically connects PBAP-based communication to the mobile phone 2 that has succeeded in the HFP-based wireless communication connection (S807).

Next, the data acquisition unit 107 transmits a history data transfer request to the mobile phone 2 so as to start a transfer process of the outgoing call history data 261, the incoming call history data 262, and the missed call history data 263 (S808).

The mobile phone 2, which has received the history data transfer request, transfers the outgoing call history data 261, the incoming call history data 262, and the missed call history data 263 to the hands-free apparatus 1 by PBAP-based Bluetooth communication. The data acquisition unit 107 stores the outgoing call history data 261, the incoming call history data 262, and the missed call history data 263, which are transferred from the mobile phone 2, in the working memory 16 or the storage memory 17 as the outgoing call history data 161, the incoming call history data 162, and the missed call history data 163.

When the transfer process of the history data ends, the data acquisition unit 107 transmits a phone book data transfer request to the mobile phone 2 so as to start a transfer process of the phone book data 264 (S809).

The mobile phone 2, which has received the phone book data transfer request, transfers the phone book data 264 to the hands-free apparatus 1 by the PBAP-based Bluetooth communication. The data acquisition unit 107 stores the phone book data 264 transferred from the mobile phone 2 in the working memory 16 or the storage memory 17 as phone book data 164.

When the transfer process of the phone book data 264 ends, the data acquisition unit 107 cuts off the PBA-based wireless communication with the mobile phone 2 (S810).

Next, the hands-free call processing unit 105 connects the HFP-based wireless communication to the mobile phone 2 again (S811).

Then, when the HFP-based wireless communication with the mobile phone 2 is established, the display control unit 102 ends the process of the flowchart.

In this way, the hands-free apparatus 1 of the present embodiment causes the mobile phone 2 to execute an outgoing/incoming call on the basis of the outgoing call history data 261, the incoming call history data 262, or the phone book data 264 stored in the mobile phone 2 and including phone numbers transmitted and received by the mobile phone 2, and when a call is terminated in the mobile phone 2, the hands-free apparatus 1 acquires the outgoing call history data 261 and the incoming call history data 262 including a phone number of a counterpart of the call from the mobile phone 2. Therefore, the hands-free apparatus 1 of the present embodiment can improve convenience related to a function of making a hands-free call by using an application having a phone function built in the mobile phone 2. More specifically, according to the hands-free apparatus 1 of the present embodiment, when the hands-free apparatus 1 makes a hands-free call, data related to the phone numbers stored in the mobile phone 2 can be used, a user can refer to the latest data without waiting for data transfer from the mobile phone 2 to the hands-free apparatus 1. After the call is terminated, the outgoing call history data 261 and the incoming call history data 262 including the phone number of the call counterpart are transmitted from the mobile phone 2 to the hands-free apparatus 1, so that the outgoing/incoming call history in the hands-free apparatus 1 can be updated so as not to be lost even when a hands-free call is made using the phone function built in the mobile phone 2.

Furthermore, the hands-free apparatus 1 of the present embodiment stores the outgoing/incoming call history data acquired from the mobile phone 2, and causes the display unit 15 of the hands-free apparatus 1 to display the outgoing/incoming call history data acquired from the mobile phone 2. Therefore, according to the hands-free apparatus 1 of the present embodiment, the outgoing/incoming call history data can be inquired even after connection between the mobile phone 2 and the hands-free apparatus 1 is disconnected.

Furthermore, the hands-free apparatus 1 of the present embodiment causes the mobile phone 2 to execute an outgoing/incoming call without using data related to phone numbers stored in the working memory 16 or the storage memory 17. Therefore, according to the hands-free apparatus 1 of the present embodiment, for example, even when it is not desired to transfer the data of the mobile phone 2 to the hands-free apparatus 1 due to requirements such as security, a user can specify the destination of outgoing/incoming calls by using data stored in the mobile phone 2 side.

Furthermore, according to the hands-free apparatus 1 of the present embodiment, an outgoing/incoming call can be made using not only the phone function of the mobile phone 2 but also the phone function of the hands-free apparatus 1, which can be selected by a user's operation.

Furthermore, the hands-free apparatus 1 of the present embodiment determines whether the mobile phone 2 can be connected to the hands-free apparatus 1 in the first connection mode, on the basis of the type and version of the OS of the mobile phone 2, and when it is determined that the mobile phone 2 can be connected, the hands-free apparatus 1 is connected to the mobile phone 2 in the first connection mode. Therefore, the hands-free apparatus 1 of the present embodiment can reduce connection with a mobile phone 2 having a type and a version of an inadequate OS.

Furthermore, the hands-free apparatus 1 of the present embodiment causes the display unit 15 to display different icon images before and after connecting to the mobile phone 2 in the first connection mode. Therefore, according to the hands-free apparatus 1 of the present embodiment, a user can easily grasp whether the hands-free apparatus 1 and the mobile phone 2 are being currently connected.

Furthermore, the hands-free apparatus 1 of the present embodiment projects an image, which is displayed on the display unit of the mobile phone 2 connected in the first connection mode, onto the display unit 15 of the hands-free apparatus 1. Therefore, according to the hands-free apparatus 1 of the present embodiment, a user of the hands-free apparatus 1 can view and operate the screen of the mobile phone 2 on the display unit 15 of the hands-free apparatus 1.

Furthermore, during a call using the function of the mobile phone 2, the hands-free apparatus 1 of the present embodiment causes information on the ongoing call to be displayed on the first screen area that is a part of the display unit 15 of the hands-free apparatus 1. Therefore, according to the hands-free apparatus 1 of the present embodiment, even when a screen is transitioned from a call screen, a user can easily grasp information on the call.

Furthermore, when the hands-free apparatus 1 of the present embodiment is connected to the mobile phone 2 in the first connection mode during a call made using the phone function of the hands-free apparatus 1 via the mobile phone 2, the hands-free apparatus 1 switches the call using the phone function of the hands-free apparatus 1 into a call using the phone function of the mobile phone 2. Therefore, according to the hands-free apparatus 1 of the present embodiment, a user can switch the means for a call while continuing a call.

Furthermore, when the hands-free apparatus 1 of the present embodiment is connected to another mobile phone that is different from the mobile phone 2 in the first connection mode during a call using the phone function of the hands-free apparatus 1, the hands-free apparatus 1 disconnects or continues the connection between the mobile phone 2 during a call and the hands-free apparatus 1 in the first connection mode in response to a user's operation. Therefore, according to the hands-free apparatus 1 of the present embodiment, the connection can be continued or disconnected in accordance with user's usage state and request.

While certain embodiments have been described, these embodiments have been presented by way of example only, and are not intended to limit the scope of the invention. These embodiments may be embodied in a variety of other forms; furthermore, various omissions, substitutions and changes may be made without departing from the spirit of the invention. These embodiments and modifications thereof fall within the scope and spirit of the invention and within the scope of the invention defined in the appended claims and equivalents thereof.

An on-vehicle hands-free apparatus and a communication control method according to the present disclosure can improve convenience related to a function of making a hands-free call by using an application having a phone function built in a mobile phone.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An on-vehicle hands-free apparatus that enables a hands-free call by being connected to a mobile phone in a wireless or wired manner, the on-vehicle hands-free apparatus comprising:
   a memory; and
   a hardware processor coupled to the memory, wherein the hardware processor is configured to:
   cause the mobile phone to execute an outgoing/incoming call using a phone function of the mobile phone based on outgoing/incoming call history data or phone book data stored in the mobile phone, the outgoing/incoming call history data including a phone number transmitted and received by the mobile phone; and
   acquire the outgoing/incoming call history data including a phone number of a counterpart of a call from the mobile phone when the call is terminated on the mobile phone,
   wherein the hardware processor is configured to:
   execute an outgoing/incoming call by using a phone function of the on-vehicle hands-free apparatus; and
   receive a user's operation for giving instruction to make connection to the mobile phone in a first connection mode in which a call using a function of the mobile phone is implementable by the hardware processor, wherein
   the hardware processor is configured to make connection to the mobile phone in the first connection mode when receiving the user's operation for giving instruction to make connection to the mobile phone in the first connection mode, wherein
   the hardware processor is configured to cause a first display of the on-vehicle hands-free apparatus to display a first icon image before receiving the user's operation for giving instruction to make connection to the mobile phone in the first connection mode, and hide the first icon image and cause the first display to display a second icon image different from the first icon image after making connection to the mobile phone in the first connection mode.

2. The on-vehicle hands-free apparatus according to claim 1, further comprising a storage that is able to store the outgoing/incoming call history data acquired from the mobile phone by the hardware processor, wherein
   the hardware processor is further configured to cause the first display of the on-vehicle hands-free apparatus to display the outgoing/incoming call history data acquired from the mobile phone by the hardware processor.

3. The on-vehicle hands-free apparatus according to claim 2, wherein the hardware processor is configured to cause the mobile phone to perform outgoing call processing without using data related to a phone number stored in the storage.

4. The on-vehicle hands-free apparatus according to claim 1, wherein
   the hardware processor is further configured to determine whether the mobile phone is connectable to the on-vehicle hands-free apparatus in the first connection mode, based on a type and a version of an operating system (OS) of the mobile phone, and
   the hardware processor is configured to make connection to the mobile phone in the first connection mode when determining that the mobile phone is connectable to the on-vehicle hands-free apparatus in the first connection mode.

5. The on-vehicle hands-free apparatus according to claim 1, wherein the hardware processor is configured to:
   acquire an image displayed on a second display of the mobile phone connected in the first connection mode, and
   cause the first display of the on-vehicle hands-free apparatus to display the image acquired by the hardware processor, to cause a screen of the second display to be projected onto the first display.

6. The on-vehicle hands-free apparatus according to claim 1, wherein the hardware processor is configured to display information on the call being made, on a first screen area that is a part of the first display of the on-vehicle hands-free apparatus, during the call using the function of the mobile phone by the hardware processor.

7. The on-vehicle hands-free apparatus according to claim 1, wherein
the hardware processor is further configured to make connection to the mobile phone in a second connection mode different from the first connection mode, and execute an outgoing/incoming call via the mobile phone by using the phone function of the on-vehicle hands-free apparatus, and
the hardware processor is configured to, when the on-vehicle hands-free apparatus is connected to the mobile phone in the first connection mode during a call via the mobile phone by using the phone function of the on-vehicle hands-free apparatus, switch the call using the phone function of the on-vehicle hands-free apparatus to the call using the phone function of the mobile phone.

8. The on-vehicle hands-free apparatus according to claim 1, wherein
the hardware processor is further configured to make connection to the mobile phone in a second connection mode different from the first connection mode, and execute an outgoing/incoming call via the mobile phone by using the phone function of the on-vehicle hands-free apparatus, and
the hardware processor is configured to disconnect or continue connection between the mobile phone and the on-vehicle hands-free apparatus in the first connection mode in accordance with a user's operation, when the on-vehicle hands-free apparatus is connected to another mobile phone that is different from the mobile phone, in the first connection mode during the call using the phone function of the on-vehicle hands-free apparatus.

9. A communication control method comprising:
causing a mobile phone to execute an outgoing/incoming call using a phone function of the mobile phone based on outgoing/incoming call history data or phone book data stored in the mobile phone, the outgoing/incoming call history data including a phone number transmitted and received by the mobile phone;
acquiring the outgoing/incoming call history data including a phone number of a counterpart of a call from the mobile phone when the call is terminated on the mobile phone;
executing an outgoing/incoming call by using a phone function of the on-vehicle hands-free apparatus;
receiving a user's operation for giving instruction to make connection to the mobile phone in a first connection mode in which a call using a function of the mobile phone is implementable;
making connection to the mobile phone in the first connection mode when receiving the user's operation for giving instruction to make connection to the mobile phone in the first connection mode; and
causing a first display of the on-vehicle hands-free apparatus to display a first icon image before receiving the user's operation for giving instruction to make connection to the mobile phone in the first connection mode, and hiding the first icon image and causing the first display to display a second icon image different from the first icon image after making connection to the mobile phone in the first connection mode.

10. A non-transitory computer-readable nonvolatile memory on which an executable program is recorded, the program instructing a computer to carry out:
causing a mobile phone to execute an outgoing/incoming call using a phone function of the mobile phone based on outgoing/incoming call history data or phone book data stored in the mobile phone, the outgoing/incoming call history data including a phone number transmitted and received by the mobile phone;
acquiring the outgoing/incoming call history data including a phone number of a counterpart of a call from the mobile phone when the call is terminated on the mobile phone executing an outgoing/incoming call by using a phone function of the on-vehicle hands-free apparatus;
receiving a user's operation for giving instruction to make connection to the mobile phone in a first connection mode in which a call using a function of the mobile phone is implementable;
making connection to the mobile phone in the first connection mode when receiving the user's operation for giving instruction to make connection to the mobile phone in the first connection mode; and
causing a first display of the on-vehicle hands-free apparatus to display a first icon image before receiving the user's operation for giving instruction to make connection to the mobile phone in the first connection mode, and hiding the first icon image and causing the first display to display a second icon image different from the first icon image after making connection to the mobile phone in the first connection mode.

* * * * *